(12) United States Patent
Shibata et al.

(10) Patent No.: US 11,146,743 B2
(45) Date of Patent: Oct. 12, 2021

(54) DISPLAY CONTROL APPARATUS WITH FIRST CONTROLLING DEVICE AND SECOND CONTROLLING DEVICE SUPERIMPOSING BOOKMARK DATA

(71) Applicant: GODO KAISHA IP BRIDGE 1, Tokyo (JP)

(72) Inventors: Masato Shibata, Tokyo (JP); Takeo Yoshimura, Tokyo (JP)

(73) Assignee: PARONYM INC., Tokyo (JP)

( * ) Notice: Subject to any disclaimer, the term of this patent is extended or adjusted under 35 U.S.C. 154(b) by 0 days.

(21) Appl. No.: 16/649,212

(22) PCT Filed: Sep. 19, 2018

(86) PCT No.: PCT/JP2018/034581
§ 371 (c)(1),
(2) Date: May 15, 2020

(87) PCT Pub. No.: WO2019/059207
PCT Pub. Date: Mar. 28, 2019

(65) Prior Publication Data

US 2020/0304728 A1    Sep. 24, 2020

(30) Foreign Application Priority Data

Sep. 22, 2017  (JP) .............................. JP2017-182783

(51) Int. Cl.
*G06F 3/0484* (2013.01)
*H04N 5/272* (2006.01)
(Continued)

(52) U.S. Cl.
CPC ........... *H04N 5/272* (2013.01); *G06F 3/0482* (2013.01); *G06F 3/0488* (2013.01);
(Continued)

(58) Field of Classification Search
CPC ................ H04N 5/272; H04N 5/44504; G06F 3/04817; G06F 3/0482; G06F 3/0488; G06F 3/14
See application file for complete search history.

(56) References Cited

U.S. PATENT DOCUMENTS 9,088,758 B2    7/2015  Kimoto et al.
9,244,890 B2 *  1/2016  Abe ...................... G06F 40/103
(Continued)

FOREIGN PATENT DOCUMENTS

JP       10-64386       3/1998
JP    2007-088967      4/2007
(Continued)

OTHER PUBLICATIONS

International Search Report, PCT/JP2018/034581, dated Nov. 6, 2018.
(Continued)

*Primary Examiner* — Namitha Pillai
(74) *Attorney, Agent, or Firm* — Nixon & Vanderhye

(57) ABSTRACT

A display control apparatus is provided with: a first controlling device configured to perform still picture reproduction or motion picture reproduction of motion picture content, within a screen of a displaying device; a second controlling device configured to superimpose and display bookmark data indicating a bookmark having a predetermined shape, on the motion picture content only in a predetermined period on a time axis of the motion picture content, in a predetermined position or range within the screen, during the still picture reproduction or the motion picture reproduction of the motion picture content; and a holding device configured to hold the bookmark data in association with the time axis of the motion picture content.

16 Claims, 11 Drawing Sheets

(51) Int. Cl.
*G06F 3/0481* (2013.01)
*G06F 3/0482* (2013.01)
*G06F 3/0488* (2013.01)
*G06F 3/14* (2006.01)
*H04N 5/445* (2011.01)

(52) U.S. Cl.
CPC ............ *G06F 3/04817* (2013.01); *G06F 3/14* (2013.01); *H04N 5/44504* (2013.01)

(56) References Cited

U.S. PATENT DOCUMENTS

| | | | |
|---|---|---|---|
| 9,485,484 | B2 | 11/2016 | Suzuki et al. |
| 9,749,672 | B2 | 8/2017 | Suzuki et al. |
| 10,311,320 | B2 | 6/2019 | Kimoto et al. |
| 10,325,513 | B2 | 6/2019 | Uemura et al. |
| 2009/0055406 | A1 | 2/2009 | Kubono et al. |
| 2012/0117451 | A1* | 5/2012 | You ........................ G06F 16/957 715/205 |
| 2013/0182147 | A1 | 7/2013 | Kimoto et al. |
| 2013/0322843 | A1* | 12/2013 | Suzuki ..................... H04N 5/76 386/230 |
| 2015/0288848 | A1 | 10/2015 | Kimoto et al. |
| 2016/0179300 | A1 | 6/2016 | Ohashi et al. |
| 2016/0366460 | A1 | 12/2016 | Suzuki et al. |
| 2017/0221377 | A1 | 8/2017 | Uemura et al. |
| 2017/0300770 | A1 | 10/2017 | Kimoto et al. |
| 2018/0024724 | A1* | 1/2018 | Patel ................... G06F 3/04845 715/720 |
| 2019/0258889 | A1 | 8/2019 | Kimoto et al. |

FOREIGN PATENT DOCUMENTS

| | | |
|---|---|---|
| JP | 2008-278088 | 11/2008 |
| JP | 2012-221388 | 11/2012 |
| JP | 2013-008071 | 1/2013 |
| JP | 2013-025554 | 2/2013 |
| JP | 2013-168082 | 8/2013 |
| JP | 2013-251787 | 12/2013 |
| JP | 2015-198387 | 11/2015 |
| JP | 2016-080882 | 5/2016 |
| JP | 2017-016535 | 1/2017 |
| WO | WO 2007/091510 | 8/2007 |
| WO | WO-2012129336 A1 * | 9/2012 ............. G06F 16/78 |
| WO | WO 2015/019492 | 2/2015 |
| WO | WO-2016050076 A1 * | 4/2016 ........... H04N 21/472 |

OTHER PUBLICATIONS

Sasaki, K., et al., "A web-based system of partial movie viewing and comprehension resting using leaner's markers", IEICE Technical Report, vol. 110, No. 405, Jan. 21, 2011, pp. 39-44. OSSM: 0913-5685.

* cited by examiner

FIG. 4

| UID | MovieID | SioriID | StartTime(ST) | EndTime(ET) |
|---|---|---|---|---|
| GK0023645789 | MV001A | 45789-001A-01 | 00:24:13:14 | 00:24:13:20 |
| GK0023645789 | MV001A | 45789-001A-02 | 00:32:10:15 | 00:32:10:35 |
| GK0023645789 | MV001A | 45789-001A-03 | 00:45:23:44 | 00:45:24:01 |
| GK0023645789 | MV001A | 45789-001A-04 | 01:03:00:34 | 01:03:00:56 |
| GK0023645789 | MV001A | 45789-001A-05 | 01:12:32:32 | 01:12:32:48 |
| GK0023645789 | MV001A | 45789-001A-06 | 01:22:12:08 | 01:22:12:14 |

····

USER ID | ID FOR EACH MOTION PICTURE | UID+MOTION PICTURE ID | TIME CODE | TIME CODE

FIG. 5

| Color | Name | Comments |
|---|---|---|
| Red | "IMPORTANT!!" | "EVERYBODY TENDS TO FORGET THIS, SO TRY TO REMEMBER HARD" |
| Red | "IT WILL BE ON THE TEST" | "" |
| Blue | "INTERESTING" | "DIDN'T KNOW ABOUT THIS WAY OF SAYING.." |
| Yellow | "DIDN'T KNOW" | "" |
| Yellow | "ATTENTION" | "THIS MAY BE VERY IMPORTANT. NEED TO PAY ATTENTION" |
| Blue | "INTERESTING" | "" |

····

COLOR DESIGNATION | TEXT | TEXT

FIG. 6

| USER ID | LOCATION TO REGISTER | FIRST CHOICE | SECOND CHOICE | DEVIATION VALUE |
|---|---|---|---|---|
| GK0023645788 | SHINAGAWA EKI MAE | A | B | 75 |
| GK0023645789 | YOKOHAMA | B | D | 58 |
| GK0023645790 | OMIYA | C | B | 72 |
| ⋮ | | ⋮ | ⋮ | |

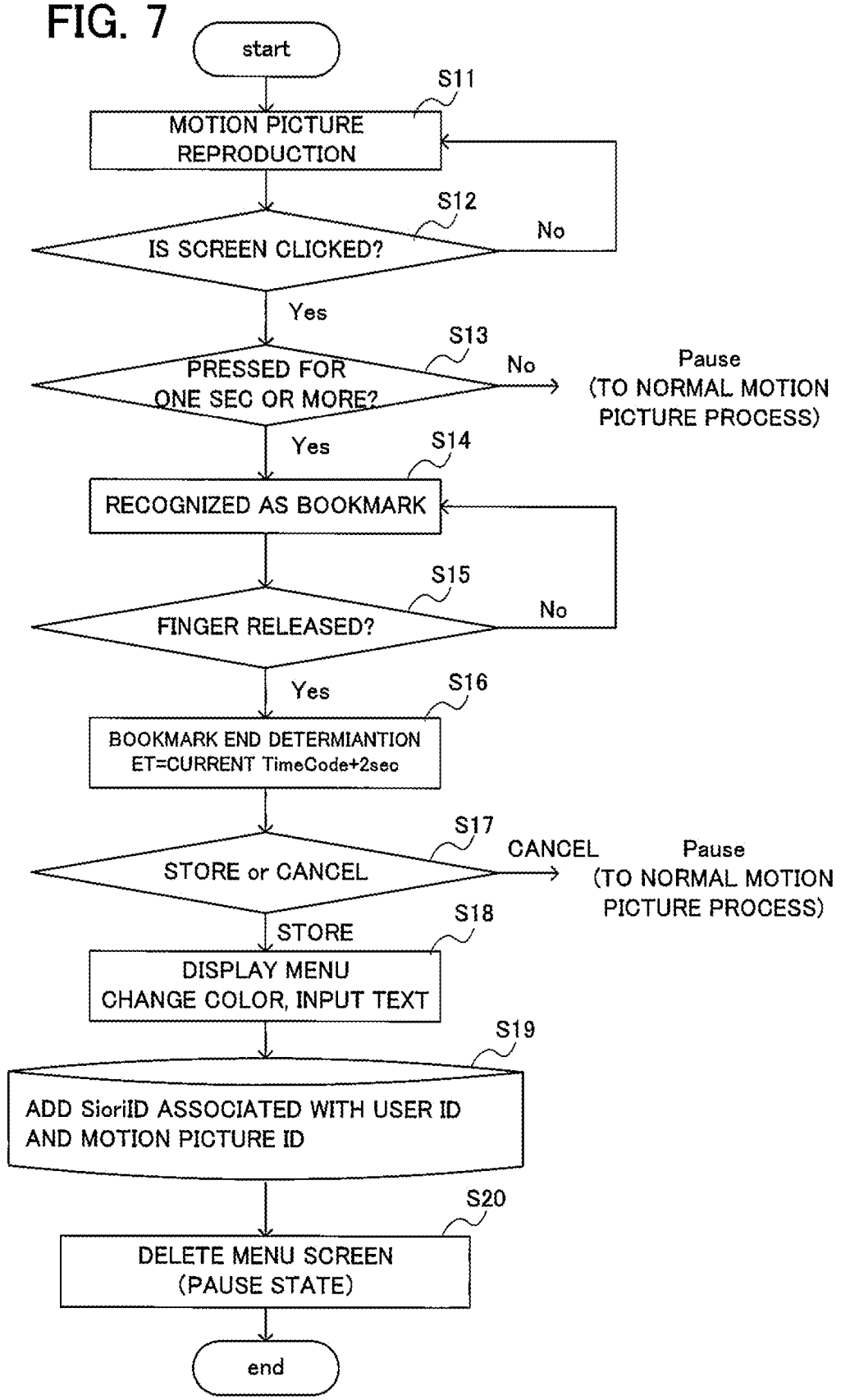

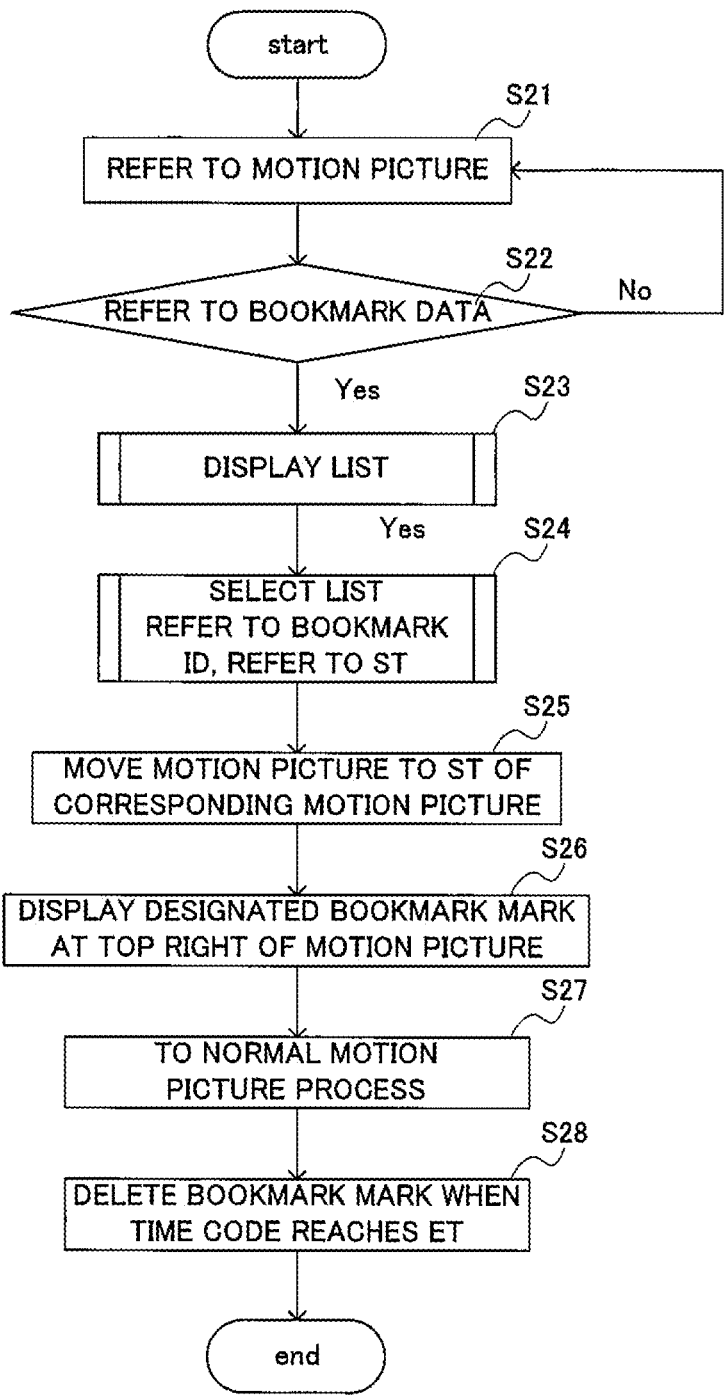

FIG. 9

| Contents | LECTURER | WATCHED | BOOKMARK (PRESENCE) |
|---|---|---|---|
| PHYSICS 1ST DAY | MR. TANAKA | NOT YET | — |
| PHYSICS 2ND DAY | MR. TANAKA | WATCHED | — |
| PHYSICS 3RD DAY | MR. TANAKA | WATCHED | ◯ |
| PHYSICS 4TH DAY | MR. TANAKA | IN THE MIDDLE | ◯ |
| . | . | . | . |
| . | . | . | . |
| . | . | . | . |
| ENGLISH 1ST DAY | MR. SUZUKI | WATCHED | ◯ |
| . | . | . | . |
| . | . | . | . |
| . | . | . | . |

FIG. 12
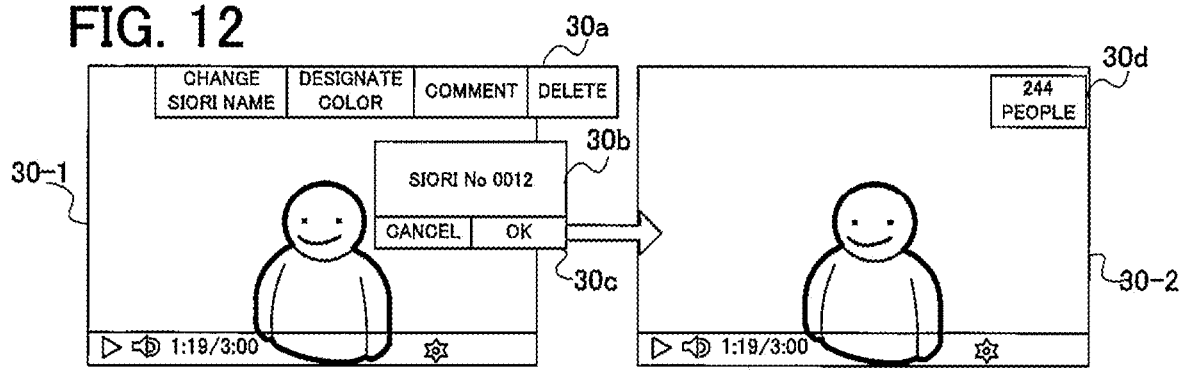
FIG. 13
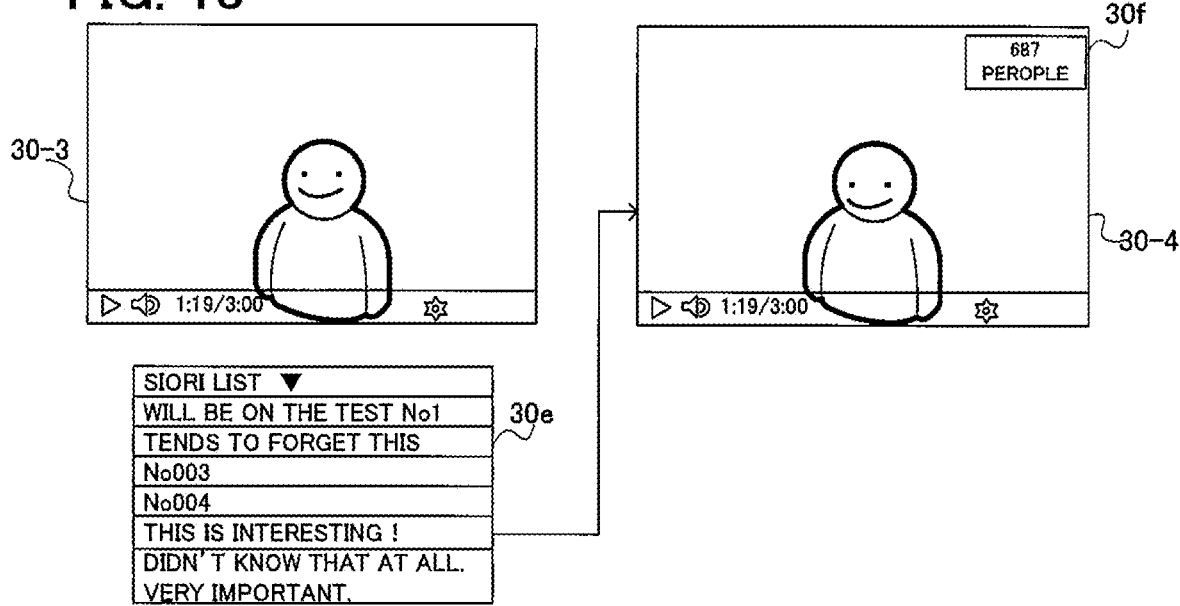
FIG. 14
| USER A MOTION PICTURE S | USER B MOTION PICTURE S | USER C MOTION PICTURE S |
|---|---|---|
| sioriA-1 | sioriB-1 | sioriC-1 |
| sioriA-2 | sioriB-2 | sioriC-2 |
| sioriA-3 | sioriB-3 | sioriC-3 |
| sioriA-4 | sioriB-4 | sioriC-4 |
| sioriA-5 | sioriB-5 | sioriC-5 |
| sioriA-6 | sioriB-6 | |
| sioriA-7 | sioriB-7 | |
| | sioriB-8 | |
| | sioriB-9 | |
| | sioriB-10 | |
| SIORI A FILE | SIORI B FILE | SIORI C FILE |
| 13a | 13b | 13c |

# DISPLAY CONTROL APPARATUS WITH FIRST CONTROLLING DEVICE AND SECOND CONTROLLING DEVICE SUPERIMPOSING BOOKMARK DATA

TECHNICAL FIELD

The present invention relates to, for example, a display control apparatus configured to add a bookmark (or a bookmarker, or a "siori" in Japanese), electronically or as image data, during reproduction and display of image content, and a computer program for making a computer function as such an apparatus.

BACKGROUND ART

For this type of apparatus, development is made on an apparatus configured to add an "electronic bookmark" to an electronic document or a page of a book displayed on a screen, in the same manner as putting a bookmark in a paper book (refer to various commercially available digital book readers), and various proposals are made (refer to Patent Literatures 1 to 3).

CITATION LIST

Patent Literature

Patent Literature 1: Japanese Patent Application Laid Open No. 2013-168082
Patent Literature 2: Japanese Patent Application Laid Open No. 2013-008071
Patent Literature 3: Japanese Patent Application Laid Open No. 2012-221388

SUMMARY OF INVENTION

Technical Problem

According to the background art, however, the bookmark cannot be added to motion picture content, even though it can be added to still image content. In other words, in order to look again at an important part of the motion picture content or at a part that is desirably looked at again later, it is basically necessary to store or memorize a place of the part.

For example, it may be possible to treat each piece of frame images of the motion picture content as the still picture content and to add bookmark data to each of the still picture content, through the application of the background art. In order to do so, however, it is necessary to add the bookmark data to a large number of still image contents (i.e., a large number of frame images). This is not practical from various viewpoints, such as an amount of an adding work imposed on a user, a data processing amount or throughput required for the apparatus, and a data amount to be processed or held.

Regarding the work for adding the bookmark, if an operation of embedding an image portion indicating the bookmark into an object, which is in a motion picture as a part of the motion picture content, is performed on the side of a provider of the motion picture content or a viewer thereof, then, it basically requires expertise, such as knowledge of computer programs or knowledge of system engineering. Alternatively, it may be generally complicated, advanced, and large-scale to construct an apparatus or data for adding the bookmark in accordance with the content or movements of multifarious motion picture contents in which a scene and an angle can be arbitrarily changed.

On the other hand, if the addition of the bookmark to the motion picture content is allowed, the motion picture content may lose its arbitrariness or degree of freedom. In other words, this may cause a viewer to add the bookmark later only on the exclusive motion picture content configured such that the bookmark can be added. Particularly, according to studies by the present inventors, it is a matter of daily practice that the motion picture content that a providing source or a distribution source of the motion picture content wants to provide is frequently changed, added, or deleted. Thus, if the bookmark is added to the motion picture content, it is supposedly desirable that the bookmark can be designated or changed in an easy or quick operation according to circumstances.

In view of, for example, the technical problem described above, it is therefore an object of the present invention to provide a display control apparatus that enables a desired bookmark to be added to arbitrary motion picture content on the side of a providing source of a video lesson or on the side of a viewer thereof. It is also another object of the present invention to provide a computer program for making a computer function as such a display control apparatus.

Solution to Problem

The above object of the present invention can be achieved by a display control apparatus, provided with: a first controlling device configured to perform still picture reproduction or motion picture reproduction of motion picture content, within a screen of a displaying device; a second controlling device configured to superimpose and display bookmark data, which indicates a bookmark having a predetermined shape and which is independent of the motion picture content, on the motion picture content only in a predetermined period on a time axis of the motion picture content, in a predetermined position or range within the screen, during the still picture reproduction or the motion picture reproduction of the motion picture content; and a holding device configured to hold the bookmark data in association with the time axis of the motion picture content.

The above object of the present invention can be also achieved by a computer program for making a computer function as the display control apparatus according to the present invention described above.

The effect of the present invention and other benefits will become apparent from the following description of embodiments.

DESCRIPTION OF EMBODIMENTS

<Display Control Apparatus>
<1>

In order to solve the problem described above, a display control apparatus according to an embodiment is provided with: a first controlling device configured to perform still picture reproduction or motion picture reproduction of motion picture content, within a screen of a displaying device; a second controlling device configured to superimpose and display bookmark data, which indicates a bookmark having a predetermined shape and which is independent of the motion picture content, on the motion picture content only in a predetermined period on a time axis of the motion picture content, in a predetermined position or range within the screen, during the still picture reproduction or the motion picture reproduction of the motion picture content;

and a holding device configured to hold the bookmark data in association with the time axis of the motion picture content.

According to the display control apparatus in the present invention, the bookmark data indicating the bookmark having the predetermined shape (including not only a "bookmark" in a narrow sense, but also something that is generally referred to as a "sticky note", a "highlight", a "highlighter" and the like in a broad sense), is superimposed and displayed on the motion picture content only in the predetermined period during the still picture reproduction or the motion picture reproduction of the motion picture content. The "first controlling device" and the "second controlling device" according to the embodiment may be formed as different units independently of each other, or may be integrally formed, partially as an IC chip or as one unit in which various parts are put together as one body. Each of the controlling devices is provided, for example, with a CPU, a microcomputer, a memory, and the like.

The first controlling device provides the displaying device, which is separate from or is built in the first controlling device (i.e., the displaying device having the "screen" according to the embodiment) with various signals, such as an image signal, an image control signal, a timing signal, and a synchronization signal, corresponding to the motion picture content to be displayed, and may perform a display control of the displaying device. The second controlling device provides the display device with various signals, such as an image signal, an image control signal, a timing signal, and a synchronization signal, corresponding to the bookmark data to be superimposed and displayed on the motion picture content, and may perform the display control of the displaying device.

The expression "superimposed and displayed on the motion picture content" may mean, in a narrow sense, being displayed by making a part of the motion picture content invisible only in a superimposed part, but may also include a meaning of being displayed as a part of a task bar, a band, a frame, a rim, a window, a sub or small screen, etc., which can exist at the left, right, top, or bottom of the motion picture content, or in the corners thereof, or the like, or a meaning of being superimposed and displayed on such a task bar or the like. Moreover, "superimposed and displayed on the motion picture content" may also include such a meaning that the motion picture content hidden under the bookmark data is seen through or partially seen, due to a semitransparent display or a blinking display of the bookmark data superimposed and displayed. In short, as long as the presence of the bookmark can be visually determined at a time point during the display of the motion picture content, various methods can be adopted as a method of displaying the bookmark.

In any case, the displaying device is provided for a personal computer, a touch panel, a mobile device, a portable terminal device, a smart phone, a mobile phone, a high-performance television, etc, which can display the motion picture content and the bookmark data thereon, under the control of the first and second controlling devices. On the other hand, the motion picture content is not only for video lessons or for education, but is arbitrary, such as a movie, a drama, an animated cartoon, a documentary, a variety show, television shopping, and a sports program. In any use, as detailed below, the bookmark data functions accordingly.

Here, in particular, the motion picture content is typically constructed as one layer data. In contrast, the bookmark data is independent of the motion picture content, and is typically constructed as another layer data that is different from the one layer data.

In the embodiment, the expression that the bookmark data is "independent of the motion picture content" may mean that the bookmark data is not linked, as data, to the content of the motion picture content or to objects or elements that constitute the motion picture content, and that these two are related by (or only by) time point information owned by the bookmark data and time point information on a reproduction time axis of the motion picture content. In other words, typically, it may mean that the motion picture content and the bookmark data are separate layer data. Moreover, the "layer data" may mean each of two or more data (i) when there are two data or two-or-more layer data, (ii) when these data exist continuously or intermittently on one time axis (typically, both the data have the time point information or a time stamp), (iii) when these data are independent of each other in contents except for the time point or there data are not linked to each other, and (iv) when the data are generated in different layers.

In the display performed by the displaying device as described above, the bookmark data is associated with the time axis of the motion picture content. Thus, on the basis of a time point on the time axis of the motion picture content, it is possible to extremely easily realize the addition of the bookmark data only in a period in which the addition is desired on the motion picture content, in other words, a display state in which the bookmark is added in the right place of the motion picture content to an arbitrary object on the motion picture content, in terms of display or in appearance in the end.

Thus, the motion picture content remains unchanged from the original motion picture content in which there is no bookmark data. On the other hand, the bookmark data is not necessarily constructed, for example, as data in the form of being embedded in the original motion picture content. The bookmark data can be sufficiently constructed by using a generally plain or simple data structure. In other words, in the display performed by the displaying device, if the bookmark data, which has a plain or simple data structure and which is typically constructed as one layer data, is superimposed and displayed in the predetermined position or range of the motion picture content, which is typically constructed as another layer data (i.e., that is independent of the bookmark data), while a reproduction time point is matched to that of the motion picture content, then, it is possible to realize a display state in which the bookmark is added to the motion picture content as a result. Even in case that the bookmark data is added or removed, it is not necessary to revise the motion picture content itself, which is independent of the bookmark data.

As described above, the association between the bookmark and an arbitrary object in the motion picture content is performed by (i) association in the reproduction time point between the motion picture content and the bookmark data and by (ii) a period in which the bookmark data is added while the arbitrary object is watched, for example, on a provider side or a viewer side of the motion picture content (i.e., a partial period of a reproduction time of the motion picture content), regardless of the content or presence/absence of the object as data, or further regardless of switching of a chapter scene or an angle or the like. In other words, the association is accomplished with the aid of "sense of vision" on the provider side or the viewer side.

Therefore, for example, it is possible to add the bookmark to a desired part of the motion picture content for which the viewer side or the provider side feels important or difficult, and it is possible to later review only a part of the motion picture content to which the bookmark is added, once more or a plurality of times, depending on the bookmark data. Alternatively, for example, it is also possible to selectively reproduce or search for only a desired position of the motion picture content, with the aid of the held bookmark data.

The second controlling device not only may be able to display the bookmark data that is once held in the holding device, but also may be able to display the bookmark data that is specified or inputted by a bookmark designation generating or inputting device described later in real time (before, after, or simultaneously in parallel with the holding of the holding device).

The "holding device" according to the present invention is provided, for example, with a memory, a storage apparatus, a controller, or the like. The holding of the bookmark data by this may be performed apart from a place where a user of the display control apparatus operates, via a communication device. In other words, at least a part of the holding device may be placed in a remote location.

Moreover, at least a part of the display control apparatus can be also placed in a server connected to the displaying device via a network. For example, the embodiment does not exclude such a configuration that a person who is neither the provider nor the viewer of the motion picture content of a video lesson intervenes as a person having a role specialized for adding the bookmark data.

The display control apparatus as described above may be externally or internally provided in the displaying device for a providing source of the motion picture content, such as, for example, a provider of a video lesson, and is also allowed to function as a so-called GUI (Graphical User Interface) for the provider of the motion picture content. In this case, the bookmark data is added on the basis of the judgment of a teacher, a lecturer, another viewer, or the like. Alternatively, for example, the display control apparatus may be externally or internally provided in the displaying device for the viewer of the motion picture content, such as, for example, a student of a video lesson, and is also allowed to function as a GUI for the viewer of the motion picture content. In this case, the bookmark data is added by the judgment of a student, an audience, a viewer, or the like.

The bookmark indicated by the bookmark data superimposed and displayed on the motion picture content may be, for example, a figure resembling a bookmark put in a paper book, or may be a figure resembling a sticky note. Alternatively, it may be simply a quadrilateral or polygonal outline mark, or may be a circular outline mark. Alternatively, it may be hatching, a highlighter, or a mark using a transparent or semitransparent display, and it is arbitrary as long as the bookmark can be visually recognized on the screen. Moreover, such bookmark data performs a basic function only by simply showing the bookmark, but as detailed later, it is also possible to provide the bookmark data with a function as a button for performing a window display and a pulldown menu display.

As explained in detail above, it is possible to add a desired bookmark to the motion picture content, while adopting a relatively plain or simple apparatus configuration in a relatively plain or simple method, and this allows various reproduction displays using the bookmark, which is extremely useful in practice.

<2>

In an aspect of the display control apparatus according to the embodiment, the holding device is configured to hold one or a plurality of types of index data for searching associated with the bookmark, as a part of the bookmark data or in association with the bookmark data.

According to this aspect, it is possible to search for the bookmark data, extremely easily, by allowing the viewer, the provider, or the user to refer to the index data associated with the bookmark data (e.g., index data defined as indicating that it is often on the test, index data defined as indicating a part that is easily mistaken, etc.). For example, by using the index data defined as indicating that it is often on the test in advance, the viewer who is an examinee can skip another part and can reproduce only a part of the motion picture content to which the bookmark indicating that it is often on the test is added.

<3>

In another aspect of the display control apparatus according to the embodiment, it is further provided with a bookmark designation generating device configured to designate or generate the bookmark data, in accordance with an input of an instruction indicating addition of the bookmark data, during the still picture reproduction or the motion picture reproduction of the motion picture content.

According to this aspect, it is possible to add the bookmark to the motion picture content in a desired period (i.e., a desired reproduction time) thereof, by inputting the instruction indicating the addition of the bookmark data by using the bookmark designation generating device, for example, both on the viewer side including an examinee or on the provider side including a lecturer, etc.

As a specific example of the bookmark designation generating device according to the embodiment, it is possible to adopt various existing operating apparatuses, which can perform an icon operation, a drawing operation, a display operation, or the like within the screen, such as, for example, a touch panel, a mouse, and a keyboard.

<4>

In an aspect in which the bookmark designation generating device is provided, the bookmark designation generating device may be configured to designate or generate the bookmark data accompanied by at least one of a color, a name, and a comment associated with the bookmark, in accordance with an input of an instruction indicating designation of the at least one, in addition to the instruction indicating the addition, and the second controlling device may be configured to display the bookmark data in accordance with the at least one that accompanies the bookmark data.

By virtue of such a configuration, for example, the viewer side including an examinee can add the comment regarding their own "commentary", "related matter", "applied question", etc., to the bookmark. For example, the provider side including a lecturer, etc., and the viewer side including an examinee can add the name that is "it will be definitely on the test", "it tends to be on the test", "this is easily forgotten", "this is interesting" or the like, to the bookmark. Alternatively, the name that is "very important", "important", "attention" or the like, to the bookmark. It is also possible to add different-colored bookmarks in red, blue, yellow, etc., which are classified in color as something that corresponds to a degree of importance, by an objective judgment based on statistic data, which has a higher objectivity than a subjective judgment on the provider side or the viewer side. In any case, this can improve a utility value of the bookmark.

<5>

In this configuration, moreover, the bookmark designation generating device may be configured to designate or generate the at least one within a window screen or on a pulldown menu, which is superimposed and displayed on at least one of the motion picture content and the bookmark data.

By virtue of such a configuration, in the addition of the bookmark, it is possible to designate or generate the color, the name, or the comment associated with the bookmark, or the like, simply and quickly, by using the window screen or the pulldown menu, which is opened and developped on the motion picture content or the bookmark data.

<6>

In an aspect in which the bookmark designation generating device described above is provided, the screen may be a screen of a touch panel, and the bookmark designation generating device may be configured to use a contact with the touch panel made by an operator as a trigger for starting generation of the bookmark data, and may be configured to use an end of the contact as a trigger for ending the generation of the bookmark data.

By virtue of such a configuration, it is possible to add the bookmark in a desired period corresponding to a period between the two triggers, by performing a simple operation in which, for example, an examinee who is on the viewer side or an operator who is on the provider side, such as a lecturer, makes the contact with the touch panel, which constitutes the screen on which the motion picture content is displayed, with a finger tip or a touch pen, and by performing a simple operation in which the contact is stopped at a time interval or with a distance within the screen, and this is extremely useful in practice.

The bookmark data may be generated such that not only a bookmark having a fixed shape set in advance, but also a bookmark having a variable shape corresponding to how to make the contact are displayed, as the bookmark. Moreover, the bookmark data may be generated such that the bookmark is displayed not only in a position within the screen that is fixed in advance, but also in a position within the screen that changes in accordance with how to make the contact, as the bookmark.

<7>

Alternatively, in an aspect in which the bookmark designation generating device described above is provided, the bookmark designation generating device may be configured to use a first operation performed by an operator on a mouse, as a trigger for starting generation of the bookmark data, and may be configured to use a second operation on the mouse as a trigger for ending the generation of the bookmark data.

By virtue of such a configuration, it is possible to add the bookmark in a desired period corresponding to a period between the two triggers, by performing a simple operation in which, for example, an examinee who is on the viewer side or an operator who is on the provider side, such as a lecturer, performs the operation of the mouse on the motion picture content, and this is extremely useful in practice.

Even in this case, the bookmark data may be generated such that not only a bookmark having a fixed shape set in advance, but also a bookmark having a variable shape corresponding to how to change from the first operation to the second operation are displayed, as the bookmark. Moreover, the bookmark data may be generated such that the bookmark is displayed not only in a position within the screen that is fixed in advance, but also in a position within the screen that changes in accordance with how to change from the first operation to the second operation, as the bookmark.

<8>

In an aspect associated with the trigger for starting the generation of the bookmark and the trigger for ending the generation of the bookmark, the holding device may be configured to hold time index data indicating, as the predetermined period, a period corresponding to a time length between (i) a predetermined time before the trigger for starting the generation and (ii) a predetermined time after the trigger for ending the generation, as a part of the bookmark data or in association with the bookmark data.

By virtue of such a configuration, during the reproduction of the motion picture content, it is possible to allow the bookmark data to be added from a part of the motion picture content corresponding to some time before an actual operation start (i.e., the contact with the touch panel or the first operation of the mouse) for adding the bookmark data, which is performed by the operator, and it is also possible to allow the bookmark data to be added to a part of the motion picture content corresponding to some time after an actual operation end (i.e., the release of the contact from the touch panel or the second operation of the mouse) for adding the bookmark data, which is performed by the operator, and thus, an operation of adding the bookmark data is facilitated. In other words, if a part of the motion picture content to which the bookmark data is added is reproduced on the basis of the bookmark data, then, it is possible to avoid such a detrimental effect that the reproduction is started from the middle without reproducing an essential initial part, or such a detrimental effect that the reproduction is stopped without reproducing an essential last concluding part, in a relatively simple method and apparatus configuration. For example, it is extremely useful in practice by providing such a configuration that the bookmark data is added from two seconds before or several seconds before the actual operation start for adding the bookmark data and the bookmark is added until two seconds after or several seconds after the actual operation end for adding the bookmark data.

On the other hand, it is also possible to provide such a configuration that the predetermined period may be set to a moment, i.e., a short time period or time point, and that the bookmark data is added to a predetermined unit that constitutes the motion picture content, such as a scene, a chapter, a track, a series of sentences or a sentence, including the short time period or time point.

<9>

Alternatively, in an aspect associated with the trigger for starting the generation of the bookmark and the trigger for ending the generation of the bookmark, the first controlling device may be configured to change from the motion picture reproduction of the motion picture content to the still picture reproduction, if the contact or the operation of the mouse is performed for a time period that is shorter than a predetermined time period.

By virtue of such a configuration, the motion picture content can be changed to a still picture image, in accordance with a short contact time with the touch panel or a short operation time of the mouse.

<10>

Alternatively, in an aspect associated with the trigger for starting the generation of the bookmark and the trigger for ending the generation of the bookmark, the bookmark designation generating device may be configured to use the contact or the operation of the mouse as the trigger, only if the contact or the operation of the mouse is performed for a time period that is longer than a predetermined time period.

By virtue of such a configuration, the contact or the operation is recognized as the trigger, only if not a short-time or momentary erroneous contact or error but the contact or the operation (which is typically the contact with the touch panel or the mouse operation) is continued for the time period that is longer than the predetermined period and that is long enough to read the user's positive intention. On the other hand, if the contact or the operation is performed for a time period that is shorter than the predetermined time period, it is treated as if the contact or the operation were not performed, and the reproduction of the motion picture content is continued. It is thus possible to designate or generate the bookmark data, certainly or without an erroneous operation.

<11>

Alternatively, in an aspect associated with the trigger for starting the generation of the bookmark and the trigger for ending the generation of the bookmark, the second controlling device may be configured to display a trace of the contact or a trace of the operation of the mouse performed between the trigger for starting the generation and the trigger for ending the generation, as the bookmark data, by a presentation by a highlighter on the screen. By virtue of such a configuration, the bookmark data can be displayed on the motion picture content, in a variable shape corresponding to the trace of the operation by the user, and as something that extremely stands out due to the highlighter. The shape of the bookmark may include not only a simple linear shape, but also a curvy shape, a V-shape, a star shape, a question mark shape, an exclamation mark shape, etc., which are possible in a handwriting manner, and moreover, a simple character or a short sentence can be also written or drawn in this manner. As a result, it is possible to realize the bookmark having a function superior to an originally simple function of calling attention.

The presence/absence of the bookmark data can be more quickly identified through the user's sense of vision when the bookmark data is displayed in a fixed position within the screen. From this viewpoint, it can be said that it is more advantageous to display the bookmark data in the fixed position, and further, to display the bookmark data having a fixed shape in the fixed position.

<12>

Alternatively, in an aspect the bookmark designation generating device described above is provided, the first controlling device may be configured to change from the motion picture reproduction of the motion picture content to the still picture reproduction or slow reproduction, in case that the bookmark data is designated or generated by the bookmark designation generating device.

By virtue of such a configuration, it is possible to designate or generate the bookmark data, also including, for example, the comment associated with bookmark, with time allowance, with respect to the motion picture content in a scene in which the addition of the bookmark data is desired, after changing to the still picture reproduction or the slow reproduction. In other words, it is possible to make it easy to perform an operation of designating and inputting the bookmark data. More generally, from the viewpoint of accurately or certainly designating and generating the bookmark data accompanied by comment data or the like, the still picture reproduction, stop motion, or slow reproduction of the motion picture content may be preferably performed.

Moreover, it is convenient to make the motion picture content stand still, or stop it, or slow-reproduce it, for example, at timing in which the addition of the bookmark data can be confirmed on an apparatus side, or at timing in which the end of the addition of the bookmark data can be confirmed on the apparatus side, but as long as the user knows to which motion picture content the bookmark data is added, the timing of making it stand still or the like is arbitrary.

If there is only a poor movement, little movement, or no movement in the motion picture content that undergoes the motion picture reproduction or particularly in an object therein (e.g., if a sentence or a drawing written or drawn on a white board is displayed without moving), or if the user of the display control apparatus has a high operation skill and can quickly operate, then, such designation or generation of the bookmark data may be performed during the motion picture reproduction (i.e., during the reproduction of the motion picture content to which the bookmark data is to be added), such as the slow reproduction, normal reproduction, and high-speed reproduction.

<13>

In another aspect of the display control apparatus according to the embodiment, the holding device is configured to hold link destination identification information, which corresponds to the bookmark data and which identifies a desired link destination, as a part of the bookmark data or in association with the bookmark data, and the second controlling device is configured to display image data associated with a link destination, which is identified by the link destination identification information, as a part of the bookmark data or in association with the bookmark data, in addition to or instead of the motion picture content, during the motion picture reproduction or the still picture reproduction of the motion picture content.

According to this aspect, if there is the added bookmark data during the motion picture reproduction or the still picture reproduction of the motion picture content, the image data associated with the link destination corresponding to the bookmark data is displayed, for example, by performing a predetermined type of operation using a touch panel, a mouse, or the like, on the bookmark data having a function as an operation button, or on a separately displayed operation button.

As described above, it is possible to provide the bookmark data not only with a function of calling attention, which is an original function of the bookmark, but also with a part of a function of calling the link destination, which is extremely useful in practice.

Here, in general, when a link is set up to an arbitrary object in the motion picture content, if the linkage is made to the content of the motion picture content, or to the content or position of the object in the motion picture content, then, it requires a highly advanced data process, such as image analysis and image recognition. Thus, a necessary program becomes complicated and advanced, which significantly increases a processing time, a processing amount, a data amount, or the like. According to the embodiment, however, the user of the display control apparatus only needs to perform various operations associated with the bookmark data, while watching the motion picture content with the user's own eyes, and the bookmark data accordingly obtained is held by the holding device in linkage based on the reproduction time axis of the motion picture content. It is therefore possible to simply set up a link on the user side of the display control apparatus.

<14>

In another aspect of the display control apparatus according to the embodiment, the display control apparatus is accommodated in one network with another or other display control apparatuses, and the second controlling device is configured to display at least one of (i) one bookmark data generated by the another display control apparatus and (ii) processed bookmark data indicating a result of a statistic process based on a plurality of bookmark data generated by the other display control apparatuses, which are obtained via the network, in addition to or instead of the bookmark data associated with the display control apparatus.

According to this aspect, the one bookmark data generated by the another display control apparatus and the processed data indicating the result of the statistic process based on the plurality of bookmark data generated by the other display control apparatuses can be reflected in the bookmark data displayed by the display control apparatus. Here, the another display control apparatus and the other display control apparatuses are accommodated in the network, such as the Internet, together with the display control apparatus.

For example, with respect not to what is judged to be "important", "on the test", "easily mistaken", etc., by a subjective judgment made only by the viewer, but to what is judged to be "important", "on the test", etc., by a more objective judgment made by another viewer, or specially by a plurality of or many viewers indicated by the result of the statistic process, it is possible to add the bookmark data accompanied by the name, the color, or the comment indicating the judgment. It is also possible to set the processed data, not on the basis of the bookmark data associated with all the display control apparatuses accommodated in the network, but on the basis of data indicating a result of the statistic process regarding the bookmark data associated only with partial viewers who belongs to some category (e.g., the bookmark data associated only with viewers who want to apply for a particular university as a school of choice, or the bookmark data associated only with viewers who have deviation values that exceed a predetermined threshold value)

<15>

In this aspect, the second controlling device may be configured to display the bookmark data as a bookmark, wherein the bookmark expresses, in a predetermined form, a total number of the bookmark data that are associated with the same motion picture content and that have the same predetermined period or have the predetermined period that overlaps at least partially, on the basis of the processed bookmark data.

By virtue of such a configuration, the bookmark data is displayed not as a mark simply indicating a fact that the bookmark is added, but, for example, as a bookmark in the form of a numerical number statistically indicating, as text display, how many people add the bookmark in the same manner, or as a bookmark in the form of a size that changes in accordance with the total number, or as a bookmark in the form of a color that changes in accordance with the total number. Thus, the user can use not only the bookmark data added only by the user's own judgment, but also the bookmark data added by the judgment of another user, which is extremely useful.

<16>

In this aspect, the second controlling device may be configured to display image data indicating an icon whose shape varies in accordance with the total number of the bookmark data, as the processed data that replaces the bookmark data or in addition to the processed data, if the total number of the bookmark data that are associated with the same motion picture content and that have the same predetermined period or have the predetermined period that overlaps at least partially, exceeds a predetermined threshold value.

By virtue of such a configuration, if the bookmark data that has statistically great significance is generated, it is possible to display the icon whose shape is fixed or whose shape varies in accordance with the total number, as an icon indicating such significance, such as, for example, an "enthusiastic icon" indicating that the many bookmark data are added to the same part of the motion picture content. By this, regarding a position of the motion picture content to which the bookmark data, such as, for example, "it is important", "it will be on the test", and "it is easily mistaken", is added by another viewer who is also an examinee or the like, the user can use the bookmark data indicating the above. For example, in an entrance examination, it is merely a relative competition for getting better scores among viewers who are examinees. It is thus extremely useful for available viewers, for example, to use the bookmark data supported by many examinees, as described above, for the purpose of relatively making scores up or not making them down.

<17>

In another aspect of the display control apparatus according to the embodiment, the display control apparatus is further provided with an inputting device configured to input a desired character or drawing pattern during the still picture reproduction or the motion picture reproduction of the motion picture content, the second controlling device is configured to superimpose and display the desired character or drawing pattern inputted by the inputting device, on the motion picture content, together with the bookmark data or as at least a part of the bookmark data, and the holding device is configured to hold image data indicating the character or drawing pattern, in association with the bookmark data.

According to this aspect, it is possible to input the desired character or drawing pattern on the motion picture content via the inputting device, such as a keyboard, a touch panel, and a mouse, before, after, or simultaneously in parallel with the addition of the bookmark data during the reproduction of the motion picture content. For example, so-called "graffiti" are allowed. Thus, due to the presence of both the bookmark data and the character or drawing pattern inputted in this manner, it is also possible to realize a display with a more information amount or with a higher degree of freedom, visually, with respect to a desired position of the motion picture content, on the provider side or on the viewer side. The character or drawing pattern as described above is held in the holding device as the image data in association with the bookmark data. Thus, later, when the motion picture content is watched, it can be displayed with the bookmark data, which is extremely useful in practice.

<Computer Program for Display Control Apparatus>

<18>

A computer program according to an embodiment makes a computer function as the display control apparatus according to the embodiment described above (including its various aspects).

According to the computer program in the embodiment, the display control apparatus according to the embodiment described above (including its various aspects) can be relatively easily realized as a computer system reads and executes the computer program from a solid-state storage apparatus, which can be detached from or attached to the computer system, such as a universal serial bus (USB) memory or a recording medium like a ROM, a CD-ROM, a DVD-ROM, a hard disk, and the like, for storing the computer program, or as the computer system executes the computer program after downloading the program in the computer system, for example, through a communication device or the like.

<Recording Medium>

On a recording medium according to an embodiment, the computer program according to the embodiment described above is recorded.

According to the recording medium in the embodiment, by installing it in or connecting it to a computer system, or by inserting it into an appropriate reading apparatus provided for or connected to the computer system, it is possible to allow the computer system to read and execute the computer program according to the embodiment recorded on the recording medium, and the display control apparatus according to the embodiment described above can be relatively easily realized.

The effect of the present invention and other benefits will become apparent from the following practical examples.

BRIEF DESCRIPTION OF DRAWINGS

FIG. 4 is version 1 of a conceptual view illustrating a structure of bookmark data, according to the practical example.

FIG. 5 is version 2 of a conceptual view illustrating the structure of the bookmark data, according to the practical example.

FIG. 6 is version 3 of a conceptual view illustrating the structure of the bookmark data, according to the practical example.

FIG. 7 is a flowchart illustrating a flow of an example of operations of the display control apparatus, from preparation to storage of the bookmark data, according to the practical example.

FIG. 8 is a flowchart illustrating a flow of an example of an operation of searching for the bookmark data on the display control apparatus (i.e., a "jump to a bookmark"), according to the practical example.

FIG. 9 is a conceptual view illustrating a data structure of a motion picture list, according to the practical example.

FIG. 12 is a schematic conceptual view illustrating an example of a display screen when the bookmark data is added, according to the practical example.

FIG. 13 is a schematic conceptual view illustrating an example of the display screen when the bookmark data is searched for, according to the practical example.

FIG. 14 is version 1 of a conceptual view illustrating a structure of bookmark data prepared by a plurality of users, according to the practical example.

PRACTICAL EXAMPLES

Firstly, with reference to a block diagram in FIG. 1, a basic configuration of a display control apparatus according to a practical example will be explained. This apparatus is used by a user of the display control apparatus who is a viewer of a video lesson, or by a user of the display control apparatus who is a provider of the video lesson or an examination institution.

Figure 1:
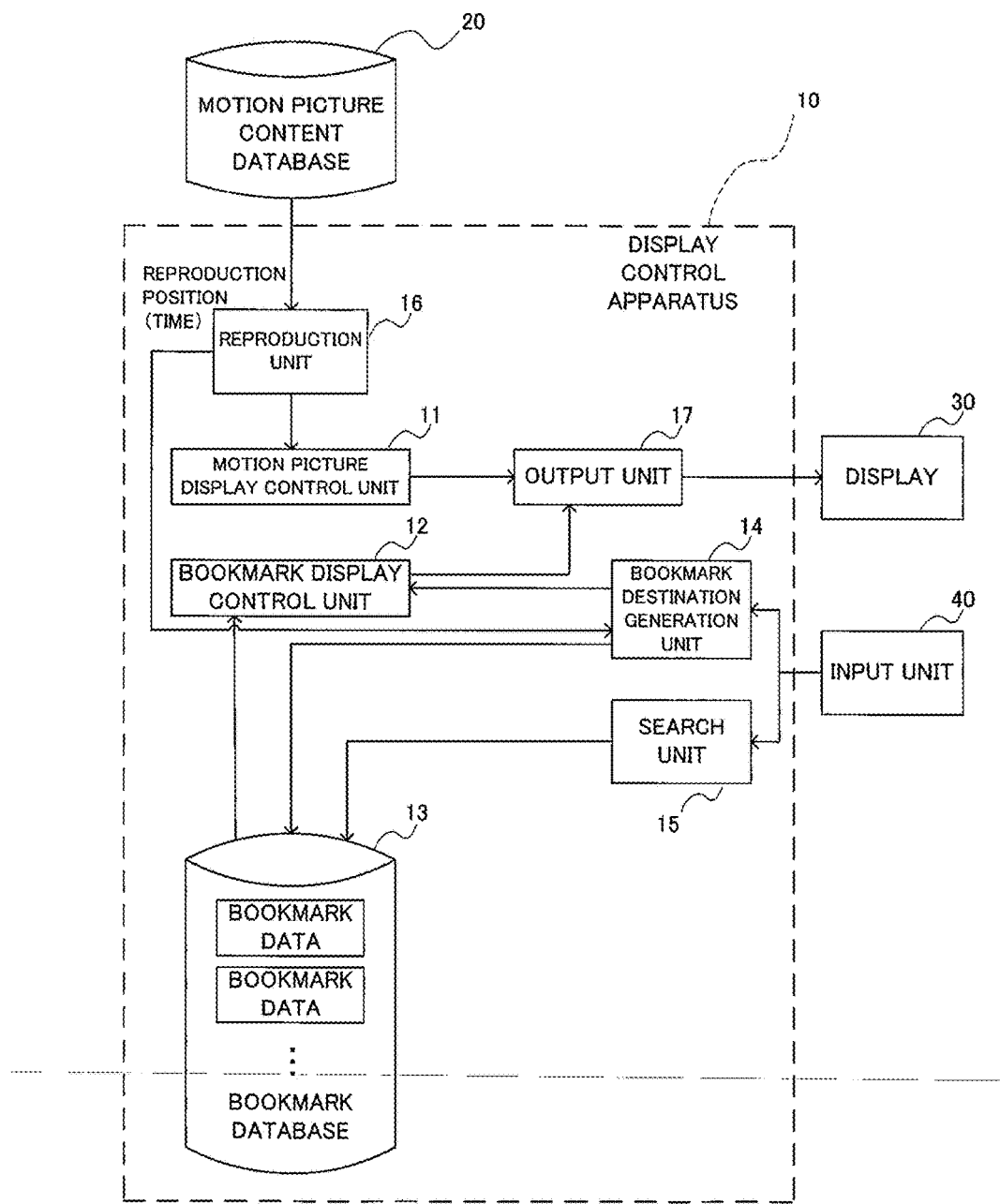
FIG. 1 is a block diagram illustrating a display control apparatus according to a practical example.

In FIG. 1, a display control apparatus 10 is provided with: a motion picture display control unit 11, which constitutes an example of the first controlling device according to the embodiment described above; a bookmark display control unit 12, which constitutes an example of the second controlling device according to the embodiment described above; a bookmark database 13, which constitutes an example of the holding device according to the embodiment described above; and a bookmark designation generation unit 14, which constitutes an example of the bookmark designation generating device according to the embodiment described above together with an input unit 40.

The display control apparatus 10 is further provided with: a search unit 15, which is configured to search the bookmark database 13 in accordance with an operation by a user via the input unit 40; a reproduction unit 16, which is configured to reproduce motion picture content provided from a motion picture content database 20; and an output unit 17, which is configured to superimpose bookmark data from the bookmark display control unit 12, onto motion picture content from the motion picture display control unit 11 in a predetermined format, and which is configured to display it on a display 30.

The motion picture content database 20 is configured to hold various motion picture contents, and may be connected to the display control apparatus 10 (or a client apparatus including the display control apparatus 10), directly in a wired or wireless manner, or through the Internet or the like in a wired or wireless manner. On the other hand, only a browser part, which is associated with the minimum display function and input function out of the display control apparatus 10, may be mainly provided on the side of the client apparatus partially including the display control apparatus 10, so that the motion picture content may be provided to the display control apparatus 10, or that the motion picture content and the bookmark data may be displayed on the display 30, in cloud technologies.

The various motion picture contents held in the motion picture content database 20 are arbitrary, such as, for example, motion picture content for video lessons or for education, a movie, a drama, an animated cartoon, a documentary, a variety show, television shopping, and a sports program.

The display 30 is provided for a personal computer, a touch panel, a mobile device, a portable terminal device, a smart phone, a mobile phone, a high-performance television, etc. The display 30 is internally or externally provided with a not-illustrated audio output unit configured to output audio data of the motion picture content.

The input unit 40 may be an input unit on a touch panel, a mouse, a tablet, a jog dial, a trackball, a keyboard, etc., and constitutes an example of the bookmark designation generating device according to the embodiment described above, together with the bookmark designation generation unit 14, such that the bookmark data can be designated and generated by performing an icon operation, a drawing operation, a display operation, or similar operations within a screen.

If an operation input indicating that a bookmark is to be added is made by the user via the input unit 40 during still picture reproduction or motion picture reproduction of the motion picture content on the display 30, then, in response to this, the bookmark designation generation unit 14 may generate the bookmark data as detailed later (refer to FIG. 4 and FIG. 5, etc.). For example, whether the user is on a viewer side including an examinee or a student preparing for an entrance examination, or on a provider side including a lecturer, it is possible to add the bookmark to the motion picture content in a desired period (i.e., in a predetermined period), by designating a part of the motion picture content that is reproduced at a desired reproduction time point or time zone, as a part in which the bookmark is to be added, by using the input unit 40 and the bookmark designation generation unit 14. A position or range in which the bookmark data is to be displayed herein may be a position or range fixed in advance, such as, for example, a top right corner of a screen, or a bottom right corner thereof, in order that the presence of the bookmark data is easily found. Alternatively, the user may designate, for example, a position or range in which the display of the motion picture content is not interrupted, via the input unit 40.

The display 30 and the input unit 40 may be configured as different bodies, or may be at least partially integrally configured; for example, a touch panel, which constitutes the input unit 40, may be overlapped and arranged on the screen of the display 30.

The bookmark database 13 is configured to hold or store a plurality of bookmark data, which includes not only data for simply displaying the bookmark, but also various data for displaying an index, a name, comment, etc. associated with the bookmark, and which further includes various data that enables a search via the bookmark data. The bookmark database 13 is provided, for example, with a memory, a storage, a controller, etc. The holding or storage of the bookmark data by this may be performed, separately from the display control apparatus 10, though a communication network, such as the Internet. Alternatively, the bookmark data may be also provided to the side of the client apparatus, which partially includes the display control apparatus 10 and which is provided mainly with the browser function, in the cloud technologies.

Next, a further explanation will be given to a configuration in which the bookmark data in the practical example is superimposed and displayed on the motion picture content, or is displayed adjacently to the motion picture content.

In FIG. 1, when desired motion picture content designated by the user via the input unit 40 or the like is provided from the reproduction unit 16, the motion picture display control unit 11 may provide various signals, such as an image signal, an image control signal, a timing signal, and a synchronization signal, corresponding to the motion picture content, to the display 30 via the output unit 17. By this, a display control associated with the display 30 may be performed.

Before, after, or in parallel with this, when the bookmark data generated by the bookmark designation generation unit 14 is provided in accordance with an operation on the input unit 40 indicating that the bookmark is to be added, or when the bookmark data designated or searched for via the input unit 40 or the like is provided from the bookmark database 13, the bookmark display control unit 12 may provide various signals, such as an image signal, an image control signal, a timing signal, and a synchronization signal, corresponding to the bookmark data to be superimposed and displayed on the motion picture content, to the display 30 via the output unit 17. By this, the display control associated with the display 30 may be performed. In the display control, the output unit 17 may function as a synthesis or combine output unit configured to superimpose and output the bookmark data on the motion picture content.

Here, the expression "superimposed and displayed on the motion picture content" by the output device 17 may include not only a meaning of simply displaying the bookmark data in a manner of hiding a part of the motion picture content, but also a meaning of being displayed as a part of a task bar, a band, a frame, a rim, a window, a sub or small screen, etc., which can exist in a periphery part of the motion picture content, on the left, right, top and bottom thereof, on the side thereof, or the like, or a meaning of being superimposed and displayed on such a task bar or the like (i.e., by making a part that used to be seen invisible, only in a superimposed part). Moreover, "superimposed and displayed on the motion picture content" may also include such a meaning that the motion picture content (or a task bar thereof, etc.) hidden under the bookmark data is seen through or partially seen, due to a semitransparent display or a blinking display of the bookmark data superimposed and displayed.

In addition, when the bookmark data is displayed, an area in which the bookmark data is displayed within the screen may be secured by changing a display size and a display shape of the motion picture content. Moreover, in a period in which the bookmark data is added, a display output form and an audio output form of the display 30 may be changed in accordance with rules provided in advance. By such a configuration, unlike a bookmark put in a paper book, even if the bookmark data is not displayed in the form of being seen by the user, the user who knows that a change in the output form indicates the presence/absence of the bookmark, allows the bookmark data that is not directly displayed on the screen, to function as a bookmark in a broad sense.

Figure 2:
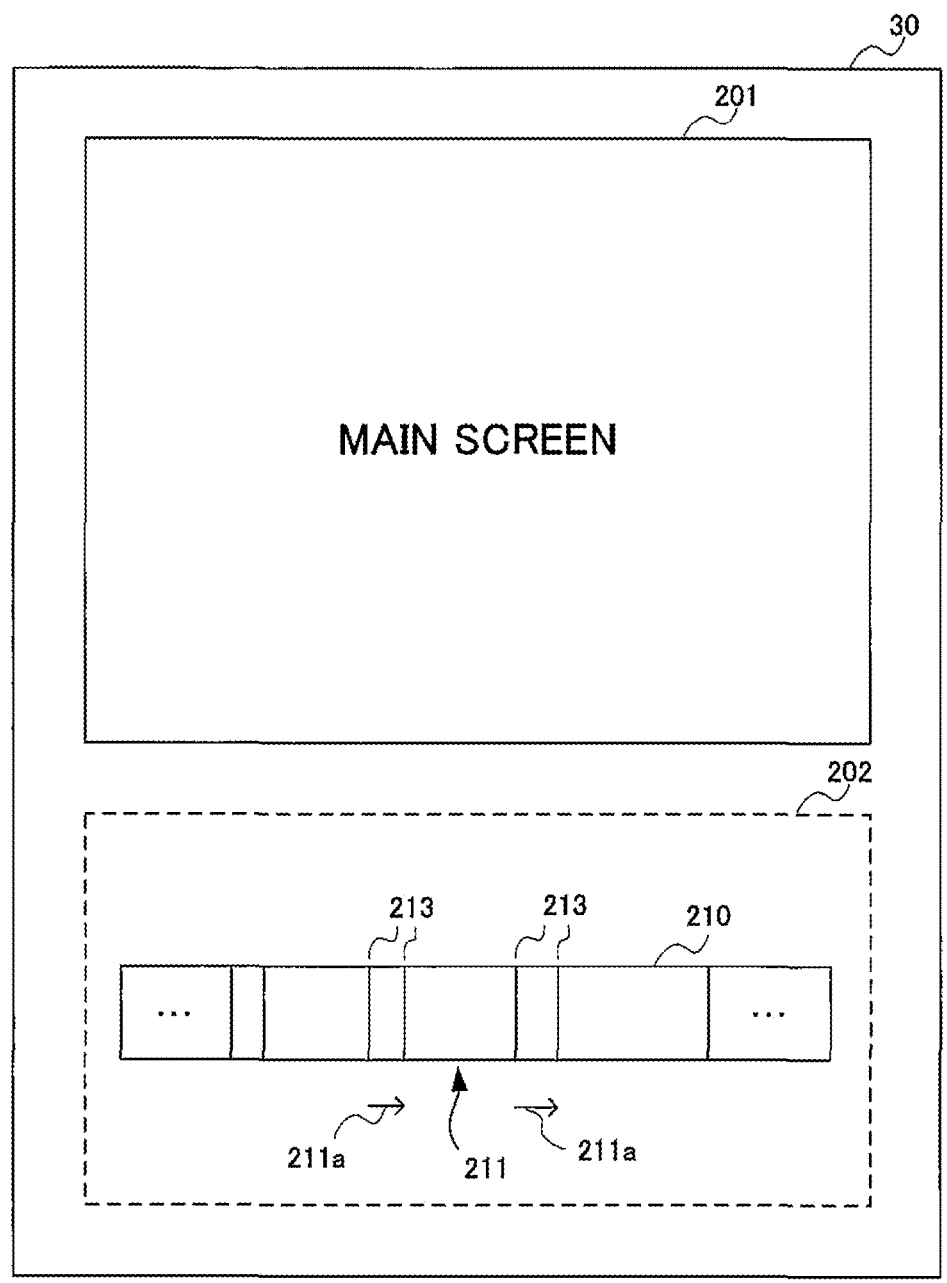
FIG. 2 is a schematic plan view illustrating an example of a screen displayed on a display according to the practical example.

For example, as illustrated in FIG. 2, on the display 30, apart from a main screen 201, a scroll bar 210 extending along a lower side of the main screen 201 may be displayed as a sub screen 202 for displaying a position of a frame image currently reproduced on the main screen 201 and a position of the bookmark. Specifically, the sub screen 202 may be configured such that the position of the frame image currently displayed on the main screen 201 is indicated by a current position mark 211, which indicates the position of the frame image by using a position in a lateral direction on the scroll bar 210 corresponding to a length of an entire motion picture (i.e., which sequentially moves to the right as in an arrow 211a in accordance with the motion picture reproduction) and such that the position of each bookmark is indicated by a bookmark mark 213 on the scroll bar 210.

Back in FIG. 1, the search unit 15 is configured to search the bookmark database 13 depending on index data, a name, or the like of the bookmark data, as detailed later, in accordance with the operation by the user via the input unit 40. When the bookmark data searched for here is provided to the bookmark display control unit 12, it is superimposed and displayed on the motion picture content, as in the case of the display of the bookmark data designated and generated in real time on the bookmark designation generation unit 14.

Particularly in the practical example, the motion picture content to be synthesized or combined by the output unit 17 is constructed as one layer data. In contrast, the bookmark data to be synthesized or combined by the output unit 17 is constructed as another layer data (e.g., not only layer data including bookmark data for simply indicating the presence/absence of a bookmark, but also layer data including bookmark data accompanied by comment data or the like, and moreover, link layer data including bookmark data accompanied even by data indicating a link destination linked to the bookmark data).

On the other hand, information indicating a reproduction position (i.e., a reproduction time or a reproduction time point) of the motion picture content is provided to the bookmark designation generation unit 14 from the reproduction unit 16. On the basis of this information, the bookmark data is generated to be associated with the time axis of the motion picture content.

At this time, the layer data that constitutes the bookmark data does not necessarily exist continuously or without interruption, in an entire time zone of the layer data that constitutes the motion picture content. It is sufficient if the layer data that constitutes the bookmark exists only in a period in which the bookmark is displayed. In other words, it is sufficient if the layer data that constitutes the bookmark data is constructed as data that exists intermittently or in a disconnected time zone only in a period in which the bookmark exists, on a reproduction time axis of the motion picture content. This may prevent a data amount of the bookmark data from excessively increasing.

As described above, on the basis of the information indicating the reproduction position on the time axis of the motion picture content, it is possible to extremely easily realize, on the screen of the display 30, the addition of the bookmark data in the desired period in which the addition of the bookmark data is desired on the motion picture content (in other words, in the desired reproduction time zone), i.e., a display state in which the bookmark data is added in the right place of the motion picture content, in terms of display or in appearance in the end.

Thus, the motion picture content remains unchanged from the original or conventional motion picture content in which there is no bookmark data. On the other hand, the bookmark data is not necessarily constructed, for example, as data in the form of being embedded in the original or conventional motion picture content. The bookmark data can be sufficiently constructed by using a generally plain or simple data structure (i.e., a simple data structure that is independent of the motion picture content as the other layer data).

Therefore, the user who watches the display 30 can add the bookmark data, for example, to a desired part of the motion picture content for which the user feels important or difficult, by the operation via the input unit 40 and the bookmark designation generation unit 14, in real time (i.e., while watching the motion picture content). Moreover, the user can later review only a part of the motion picture content to which the bookmark data is added, once more or a plurality of times, by the operation via the input unit 40 and the search unit 15, depending on the bookmark data.

Next, with reference to a block diagram in FIG. 3, an explanation will be given to an entire structure of a system including: a server apparatus and client apparatuses, each of which includes the display control apparatus illustrated in FIG. 1, and so forth.

Figure 3:
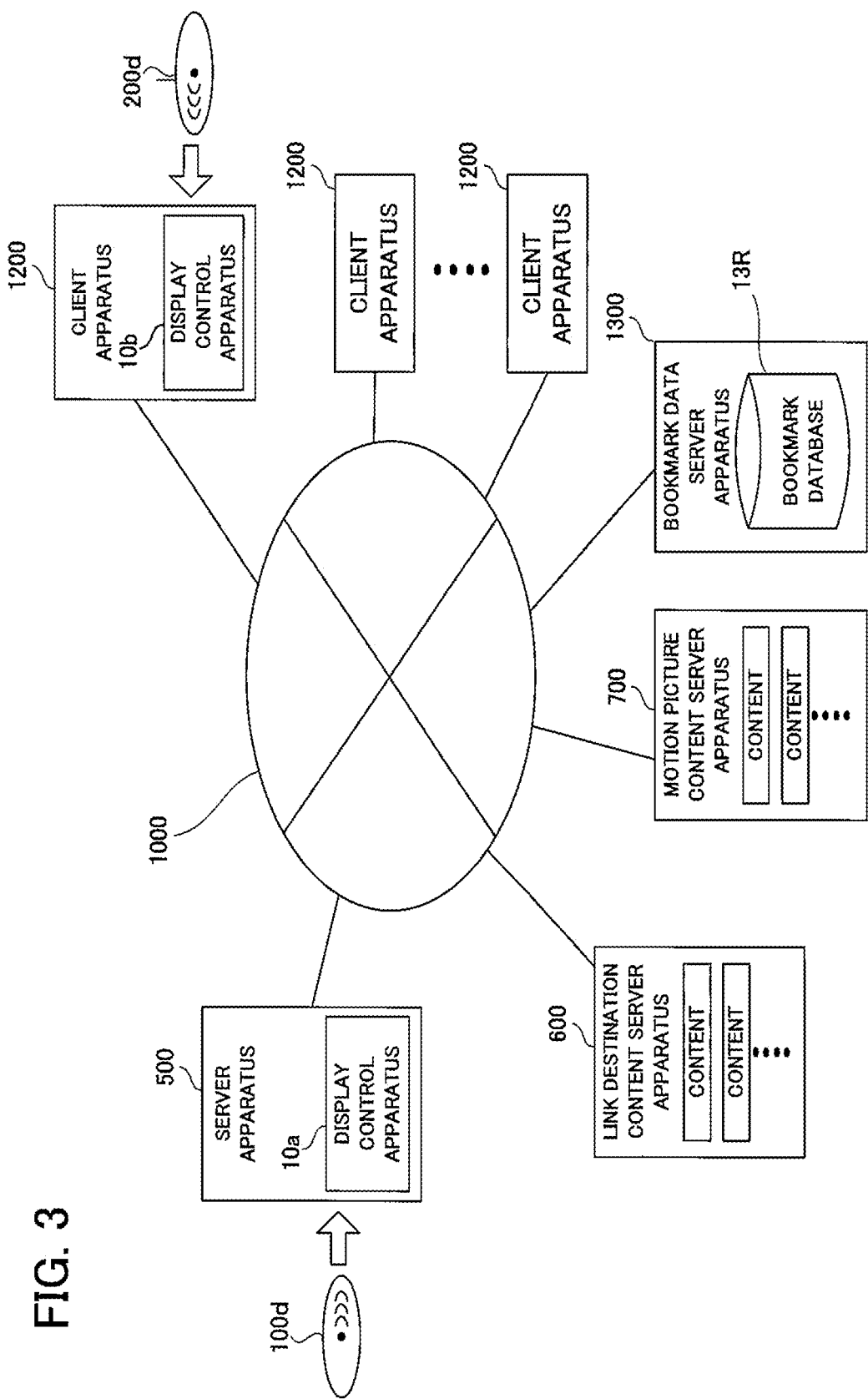
FIG. 3 is a conceptual diagram illustrating that a server apparatus and client apparatuses, each of which includes the display control apparatus, and so forth are accommodated in a communication network, according to the practical example.

In FIG. 3, an Internet 1000 accommodates a server apparatus 500 including a display control apparatus 10a and a plurality of client apparatuses 1200, each of which includes a display control apparatus 10b, and further accommodates a link destination content server apparatus 600 configured to provide the content of a link destination to the server apparatus 500 or the client apparatuses 1200, a motion picture content server apparatus 700 configured to provide the motion picture content to the server apparatus 500 or the client apparatuses 1200, and a bookmark data server apparatus 1300 including a bookmark database 13R and configured to provide the bookmark data to the server apparatus 500 or the client apparatuses 1200.

The plurality of client apparatuses 1200 are respectively placed, for example, for a plurality of examinees who take a video lesson. Each of the display control apparatuses 10b provided for the client apparatuses 1200 is configured in the same manner as the display control apparatus 10 illustrated in FIG. 1. The client apparatus 1200 includes, for example, a personal computer, a high-performance television, a mobile device, a smart phone, and the like, and an optical disc 200d can be mounted thereto. The display control apparatus 10 (refer to FIG. 1) can be relatively easily realized in the client apparatus 1200 by reading and executing a computer program, which is stored in the optical disc 200d and which is to make a computer perform various processes associated with the bookmark data as detailed later. Alternatively, such a computer program may be downloaded to the client apparatus 1200 through the Internet 1000.

The server apparatus 500 is placed, for example, at an examination institution or the like that distributes the video lesson. The server apparatus 500 and the motion picture content server apparatus 700 may be a common server, or both may be placed at the same examination institution or the like, or both may be placed in separate places. The display control apparatus 10a provided for the server apparatus 500 is configured in the same manner as the display control apparatus 10 illustrated in FIG. 1.

The server apparatus 500 includes, for example, a personal computer, a workstation, a mobile device, and the like, and an optical disc 100d can be mounted thereto. The display control apparatus 10 (refer to FIG. 1) can be relatively easily realized in the server apparatus 500 by reading and executing a computer program, which is stored in the optical disc 100d and which is to make a computer perform various processes associated with the bookmark data as detailed later. Alternatively, such a computer program may be downloaded to the server apparatus 500 through the Internet 1000.

The link destination content server apparatus 600 may be a common server with the server apparatus 500, or both may be placed at the same examination institution or the like, or both may be placed in separate places. By using the content held in the link destination content server apparatus 600, it is possible to perform a process of displaying data, such as another content, that exists in a link destination associated with the motion picture content to which the bookmark data is added, in addition to or instead of the bookmark data and the motion picture content. In other words, if there is the bookmark data that is added during the still picture reproduction or the motion picture reproduction of the motion picture content, image data associated with a link destination corresponding to the bookmark data is displayed, for example, by performing a predetermined type of operation using a touch panel, a mouse, or the like, which constitutes the input unit 40 (refer to FIG. 1), on the bookmark data having a function as an operation button (refer to FIG. 21 described later).

The motion picture content server apparatus 700 may include the motion picture content database 20 illustrated in FIG. 1, and further may include a huge volume of motion picture content data, which may be a source of the motion picture content database 20. Alternatively, if the motion picture content database 20 illustrated in FIG. 1 is placed in the server apparatus 500 or the client apparatuses 1200, it is possible to omit the motion picture content server apparatus 700.

The bookmark data server apparatus 1300 may be a common server with the server apparatus 500, or both may be placed at the same examination institution or the like, or both may be placed in separate places. Alternatively, if the system is constructed such that the bookmark database 13 provided for the display control apparatus 10 as illustrated in FIG. 1 manages and holds all the bookmark data, it is possible to omit the bookmark data server apparatus 1300 that is independent. It is also possible to provide such a configuration that a person who is neither the provider nor the viewer of the motion picture content of the video lesson (e.g., a professional who is well informed about an entrance examination or who is skilled in adding the bookmark) intervenes as a person having a role specialized for adding the bookmark data, so that that the bookmark data server apparatus 1300 is operated independently of the server apparatus 500.

Next, with reference to FIG. 4 and FIG. 5, a specific example of a data configuration of the bookmark data will be explained. FIG. 4 and FIG. 5 illustrate, for convenience, two horizontally divided parts of a drawing sheet, which illustrates a data structure of a plurality of bookmark data generated by being added to one motion picture content by one user. FIG. 4 corresponds to a left divided part, and FIG. 5 corresponds to a right divided part (i.e., a data structure in FIG. 4 and a data structure in FIG. 5 are continuous in a section of " . . . " in the drawings).

In FIG. 4 and FIG. 5, firstly, from the left to the right in FIG. 4, the bookmark data includes a user ID (UID), a motion picture ID (Movie ID), a bookmark ID (i.e, Siori ID), start time point data (Start Time (ST)), and end time point data (End Time (ET)). Then, from the left to the right in FIG. 5, the bookmark data includes color designation data (Color), name data (Name), and comment data (Comments). In the drawing, one row extending from the left to the right indicates one bookmark data. In other words, in this example the bookmark data constructed when six bookmarks are added to one motion picture content is illustrated as six-row data.

In FIG. 4, in the user ID (UID), a unique ID is assigned to a user of each display control apparatus 10 (e.g., a provider of a video lesson or each of many viewers) (FIG. 4 illustrates a single ID of "GK0023645789", from which it can be seen that the bookmark data is added by the same user). The motion picture ID (Movie ID) is an ID for each motion picture content. For example, a unique ID is assigned to each of a plurality of motion picture contents distributed in video lessons (FIG. 4 illustrates a single ID of "Movie001A", from which it can be seen that the bookmark data is added to the same motion picture content).

The bookmark ID (i.e., Siori ID) is uniquely assigned to each of the bookmark data added to a combination of the user ID (UID) and the motion picture ID (Movie ID) (FIG. 4 illustrates an ID obtained by combining "45789" associated with the user ID and "001A" associated with the motion picture ID, and further combining a serial number).

The start time point data (Start Time (ST)) indicates a time code on the reproduction time axis of the motion picture content at which the display of the bookmark data is to be started (or a specific time point (reproduction time) expressed by a unit, such as hour, minute, and second, in FIG. 4). The end time point data (End Time (ET)) indicates a time code on the reproduction time axis of the motion picture content at which the display of the bookmark data is to be ended.

In FIG. 5, the color designation data (Color) defines the color of the bookmark data displayed, for example, in accordance with a degree of importance recognized by the user or the like who designates and generates the bookmark data, depending on the user's preference or under a rule set in advance. The color designation data (Color) indicates, for each bookmark data, that a motion picture content part to which the bookmark is added is the most important by a color of red (Red), that the part is interesting (regardless of whether it is important or not, or even if it is not important) by a color of blue (Blue), or that the part is important by a color of yellow (Yellow).

The name data (Name) is added to each bookmark data, by the judgment of the user or the like who designates and generates the bookmark data, by using a name, such as "important!!", "interesting", and "it will be on the test", which indicates a category set in advance, as text data. It is permitted to give the same name to a plurality of bookmark data, and it can be used as index data for searching. In other words, for example, if watching only the part to which the bookmark data with the name data (Name) of "it will be on the test" is added, then, an examinee can watch only the part that the examinee himself or herself or other examinees or lectures literally judge that "it will be on the test".

The comment data (Comments) indicates, for each bookmark data, comment that is freely and arbitrarily prepared by the user or the like who designates and generates the bookmark data, wherein the comment is written as text data. Alternatively, the comment data (Comments) indicates, for each bookmark data, comment that is freely and arbitrarily selected from among a plurality of types of typical comments. By this, a background situation of the addition of the bookmark data, a reason, and the like can be written, briefly or in detail, in a text format. It is also possible to use the comment data as a keyword for searching. In other words, the comment data prepared in this manner can be also seen or referred to, later. Moreover, even if the comment data is not prepared, the bookmark data is completed. For the bookmark data once completed, it is also possible to add, correct, or delete the comment data or perform similar actions, later.

The bookmark data illustrated in FIG. 4 and FIG. 5 includes the name, the comment, and the like, which is convenient, but the bookmark data is effective if it is provided with a basic function as long as a viewer is informed of the addition of the bookmark. For example, the bookmark data is effective only from the part illustrated in FIG. 4, even without the part illustrated in FIG. 5. From a viewpoint of reducing labor and time for adding the bookmark data, the bookmark data may be provided with a simple and minimum basic function.

Here, as illustrated in FIG. 6, the bookmark data may include a location to register, a first-choice school, a second-choice school, and a deviation value, which are associated with the user (i.e., examinee) indicated by the user ID, in addition to the bookmark data as described above (refer to FIG. 4 and FIG. 5) or instead of a part thereof. Alternatively, the data including the location to register and the like as illustrated in FIG. 6 may be also recorded and held in linkage to the bookmark data (refer to FIG. 4 and FIG. 5).

Figure 10:
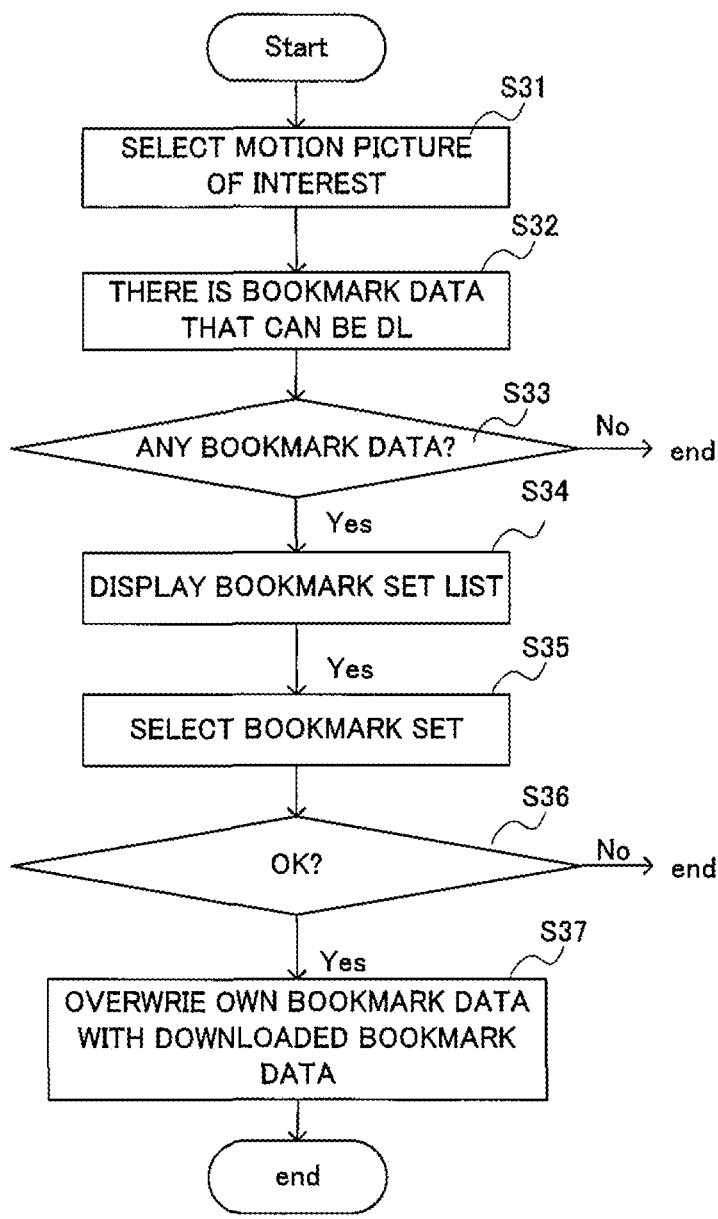
FIG. 10 is a flowchart illustrating a flow of an example of an operation of downloading the bookmark data prepared by another person on the display control apparatus, according to the practical example.

Next, with reference to flowcharts in FIG. 7 to FIG. 10 together with FIG. 1 to FIG. 6, various operations of the display control apparatus 10 will be explained with a detailed configuration thereof. Here, FIG. 7 illustrates a series of operations when the bookmark data is generated and held by the display control apparatus 10. FIG. 8 illustrates a series of operations in searching for the motion picture content part to which the bookmark data is added by the display control apparatus 10, in other words, in "jumping to a part to which the bookmark is added". FIG. 9 is a conceptual view illustrating a data structure of a motion picture list, which indicates the presence/absence of the bookmark for each content of the motion picture content, or the like. FIG. 10 illustrates a series of operations when the bookmark data prepared by another person is downloaded by the display control apparatus 10.

In FIG. 7, firstly, the motion picture reproduction of the motion picture content, such as, for example, a video lesson, is performed by the motion picture display control unit 11 (refer to FIG. 1) or the like (step S11). During that, it is continuously determined by the bookmark designation generation unit 14 (refer to FIG. 1) or the like whether or not the screen of the display 30 is clicked by the input unit 40, for example, as a touch panel operation or a mouse operation (step S12: No).

Here, if it is determined that it is clicked (the step S12: Yes), it is further determined by the bookmark designation generation unit 14 or the like whether or not the screen is pressed for one second or more, namely, whether or not a conscious pressing or contact operation by the user is performed for one second or more by a click operation of the input device 40 (step S13).

Here, if it is determined that it is not pressed for one second or more (the step S13: No), a screen display is paused, and it is transferred to a normal motion picture process.

On the other hand, if it is determined that it is pressed for one second or more (the step S13: Yes), it is recognized by the bookmark designation generation unit 14 or the like that a positive instruction indicating the addition of the bookmark is received from the user (step S14). In other words, in the practical example, if such the click operation is performed for one second or more, then, under a preset rule known by the user, it is recognized by the bookmark designation generation unit 14 or the like that an operation input indicating that the user wants to add the bookmark data is made at a place or position (in other words, at a reproduction time point) in which the click operation of the motion picture content is performed.

For example, during a video lesson, for a part that the user thinks that it will be on the test or that it is important, or for a part that the user wants to review because it is hard to understand, a user operation indicating the addition of the bookmark as described above is performed.

Moreover, it is determined by the bookmark designation generation unit 14 or the like whether or not a finger is released, i.e., whether or not a finger operation, which is performed for one second or more and which is associated with the click on the input unit 40 in which the touch panel operation or the mouse operation are performed, is released (step S15). This determination is continued (step S15: No) until it is determined that the finger is released. At this time, the time period from the click in the step S12 to the release of the finger in the step S15 (or more specifically, an elapsed time after the click in the step S12 or a time point on the reproduction time point of the motion picture content) is measured by the bookmark designation generation unit 14 or the like.

Here, if it is determined that the finger is released (step S15: Yes), it is determined by the bookmark designation generation unit 14 or the like that an operation of adding the bookmark is ended (step S16). In other words, in the practical example, if the click is released after the click operation is performed for one second or more as described above, then, under the preset rule known by the user, it is recognized by the bookmark designation generation unit 14 or the like that a positive operation input indicating that the user wants to stop the addition of the bookmark data or that the addition of the bookmark is already sufficient is made at a place or position (in other words, at a reproduction time point) in which the click of the motion picture content is released.

In the step S16, on the basis of a measurement result associated with the click performed so far, the end time point data ET (refer to FIG. 5) is generated by the bookmark designation generation unit 14 or the like by adding a margin of e.g., 2 seconds (+2 sec) to a current time point (or more specifically, a current time point indicated by a time stamp or a time code) (step S16). A value of this margin can be set by the user to a desired value.

The start time point data ST (refer to FIG. 5) is generated by the bookmark designation generation unit 14 or the like, before, after, or at the same time as the generation of the end time point data ET in the step S16 (e.g., when the step S13 is Yes, when it is recognized as the bookmark in the step S14, or in the step S16), by subtracting a margin of e.g., 2 seconds (−2 sec) from a time point at which the click is started in the step S12 (or more specifically, a time point indicated by the time stamp or time code at a time point of the start of the click). A value of this margin can be set by the user to a desired value.

By these, as illustrated in FIG. 4, the start time point data ST and the end time point data ET, i.e., a basic part of the bookmark data, is generated.

It is then confirmed whether or not the bookmark data generated in the above steps is to be stored (or saved) or to be canceled, by the bookmark designation generation unit 14 or the like via the display 30 and the input unit 40 (step S17). In the case of canceling (the step S17: CANCEL), a menu screen is deleted to pause the screen display, and it is transferred to the normal motion picture process. For example, this cancel applies to when the user reconsiders that there is no need to add the bookmark during an operation of generating the bookmark data.

On the other hand, in the case of storage (the step S17: STORE), a menu screen having a predetermined format is displayed in a pop-up manner (e.g., refer to FIG. 13 detailed later) on the display 30. The color associated with the bookmark data is designated or changed and the text that constitutes the name and the comment is designated or inputted, via the input unit 40 or the like (step S18). It is convenient if the designation or the input is performed by changing or correcting a default value, wherein the things that are commonly used are set as the default value. By these, as illustrated in FIG. 5, the color designation data (Color), the name data (Name), and the comment data (Comments), i.e., an applied part of the bookmark data, is generated.

Then, the bookmark ID (refer to FIG. 4) associated with the user ID and the motion picture ID is added, and is stored as formal bookmark data to which the bookmark ID is assigned (refer to FIG. 4 and FIG. 5) in the bookmark database 13 (refer to FIG. 1) (step S19). In other words, the bookmark data is generated, having the content that the bookmark is displayed from the start time point ST to the end time point ET in a predetermined position within the screen (e.g. at the top right within the screen) on a layer of the bookmark data, or as the layer data that constitutes the bookmark data. The motion picture content itself is not changed, is not corrected, or is not subject to similar actions based on whether or not the bookmark is added.

When the storage is performed or completed in the step S19, the menu screen is deleted to go back to a pause state or the like, which occurs before the menu screen is displayed (step S20), and a series of steps associated with the designation and generation to the storage of the bookmark data is ended.

In FIG. 8, firstly, a motion picture list associated with the user ID as illustrated in FIG. 9 is displayed. This list displays a summary of a motion picture (e.g., a content summary ("Contents") such as "physics first day", "physics second day", and "English first day", a lecturer name such as "Mr. Tanaka" and "Mr. Suzuki", etc.), and also displays whether or not it has been watched, the presence/absence of the bookmark, or the like. By the user, the motion picture content is referred to, such as, for example, a video of "Physics class 16th day" out of video lessons. Specifically, when the motion picture content is selected, if it is the first watch or if there is no bookmark, then, the motion picture reproduction of the motion picture content is performed by the motion picture display control unit 11 (refer to FIG. 1) or the like in accordance with an operation of designating the motion picture content performed by the user, such as an examinee, and the motion picture content is referred to by the user. More specifically, for example, if there is the bookmark, a position display screen appears, and it is possible to select whether it is to be reproduced from the beginning or from the position of the bookmark. When it is to be reproduced from the position of the bookmark, the user touches the bookmark to perform the reproduction from there. In particular, a part to which an important bookmark is added may be also displayed as a thumbnail (step S21). During the reproduction of the motion picture content, it is determined whether or not an instruction indicating that the user wants to refer to the bookmark data added to the motion picture that is being reproduced is inputted by the user via the input unit 40 or the like, on the basis of the bookmark ID associated with the motion picture content, or the ID of the motion picture content and the ID of the user (step S22). The determination is repeatedly performed, regularly or irregularly, while the motion picture is referred to (the step S22: No). Even in a reproduction time zone in which there is the bookmark data for the motion picture content that is being reproduced, it is also possible to keep watching the motion picture content, in the same manner as that when there is no bookmark data, selectively, according to circumstances.

If it is determined that an operation input for referring to the bookmark data is made by the user via the input unit 40 or the like (the step S22: Yes), a list of the bookmark data is superimposed and displayed on the motion picture content, or is displayed adjacent to the motion picture content, in a predetermined format (step S23). Here, the list may be always displayed in a position or range in which the display of the motion picture content is not interrupted within the screen. Alternatively, if an operation input indicating the bookmark list is to be displayed is made by the user, the list may be also displayed accordingly in the position or range in which the display of the motion picture content is not interrupted, or the list may be also displayed accordingly in a position or range in which the view of the motion picture content is interrupted.

Then, when list selection is performed by the user via the input unit 40 or the like, i.e., when one bookmark data is selected from the list including one or a plurality of bookmark data, the bookmark ID, the start time point ST, and the like associated with the selected bookmark data are referred to (step S24). They are included in each bookmark data (refer to FIG. 4).

Then the screen is moved to the start time point ST of a corresponding screen. Specifically, the reproduction position on the reproduction time axis is moved to a time point that matches the start time point ST, and the reproduction of the motion picture content is started there (step S25). Such a reproduction may be performed in accordance with an operation input instructing the start of a predetermined type of reproduction, after the motion picture content is once paused, i.e., after the still picture reproduction or after the motion picture is set in a stop state. Alternatively, after the list selection, the motion picture reproduction may be also started, immediately or after a pause period, without requiring any other operation inputs.

Then, for example, at the top right of the screen of the display 30, a process of displaying the designated bookmark mark is performed by the bookmark display control unit 12 (refer to FIG. 1) or the like (step S26).

Then, while the bookmark mark remains displayed, the normal motion operation process is performed by the motion picture display control unit 11 or the like. By these, the motion picture content part to which the bookmark mark is added is reproduced, which results in a production screen in which the bookmark mark is displayed at the top right thereof (step S27). The display of the bookmark mark (the step S26) and the display of the motion picture content (the step S27) may be performed at the same time, or the latter may be also started slightly before the former.

Then, if the motion picture content is normally reproduced until the reproduction position on the reproduction time axis matches the end time point ET, the display of the bookmark mark is deleted by the bookmark display control unit 12 in accordance with the bookmark data (step S28). The motion picture reproduction of the motion picture content is continued without a change (i.e., except that the display of the bookmark mark is deleted). This is the end of a reference operation using the bookmark data, in other words, a series of steps associated with a jump operation to the part to which the bookmark is added.

In FIG. 10, in the practical example, it is possible to download the bookmark data prepared by another person, and thus, in the practical example, the bookmark data can be separately searched for on the bookmark database 13 (refer to FIG. 1) for each motion picture. Moreover, the bookmark data can be extracted in accordance with various conditions (e.g., schools of choice in data of personal IDs are picked up, and bookmark data to which personal IDs with a school of choice A are added can be extracted, or people with high deviation values are picked up, and bookmark data to which their personal IDs are added can be extracted). Moreover, the bookmark data may be separately held in the bookmark database 13 for each motion picture ID.

In this situation, firstly, the motion picture content of interest is selected by one user (step S31). For example, a lecture of interest is selected by a user operation or the like via the input unit 40, from among a lecture list displayed on the display 30 as something that corresponds to many video lessons.

Then, regarding the selected motion picture content, a process of determining whether or not there is the bookmark data that can be downloaded (DL) is performed (step S32). As a result of the determination, if there is not the bookmark data (the step S33: No), downloading is impossible, so that a process associated with the downloading is ended.

On the other hand, if there is the bookmark data (the step S33: Yes), a list of one or a plurality of bookmark sets is displayed, wherein the one or the plurality of bookmark sets are obtained by extracting the bookmark data that is owned by or is designated and generated only by a person who satisfies a predetermined condition, out of people who have the respective bookmark data. For example, a bookmark set obtained by extracting only the bookmark data to which the personal IDs with a school of choice A are added, a bookmark set obtained by extracting only bookmark data to which personal IDs with a school of choice B are added, and the like are list up in a predetermined format on a display screen of the display 30 (step S34).

Then, the bookmark set of interest is selected by the user (step S35). For example, if the user's school of choice is B, from the viewpoint of knowing tendencies of the user's rivals or for similar viewpoints, the bookmark set including only the bookmark data to which personal IDs with a school of choice B are added is selected by a user operation or the like via the input unit 40, from among the bookmark sets displayed on the display 30.

Then, it is confirmed via the input unit 40 whether or not there is no mistake in the selection (i.e., whether the selection is OK) (step S36). If the selection of the bookmark set is not OK (the step S36: No), the process associated with the downloading is ended.

On the other hand, if the selection of the bookmark set is OK (the step S36: Yes), the user's own bookmark data is overwritten with the downloaded bookmark data (step S37). Specifically, a process of adding the downloaded bookmark data to the previous bookmark data is performed, for the motion picture ID associated with the downloaded bookmark data, on the user's bookmark database 13. Alternatively, a process of partially or completely replacing the previous bookmark data by the downloaded bookmark data may be also performed. Now, a series of downloading process is ended.

Next, with reference to FIG. 11 together with FIG. 1 or the like, an explanation will be given to how (i) a time point at which a user operation for designating and generating the bookmark data is performed and (ii) time points (i.e., positions on the reproduction time axis) of the start time point ST and the end time point ET of the bookmark accordingly generated, are set on the reproduction time axis of the motion picture content.

Figure 11:
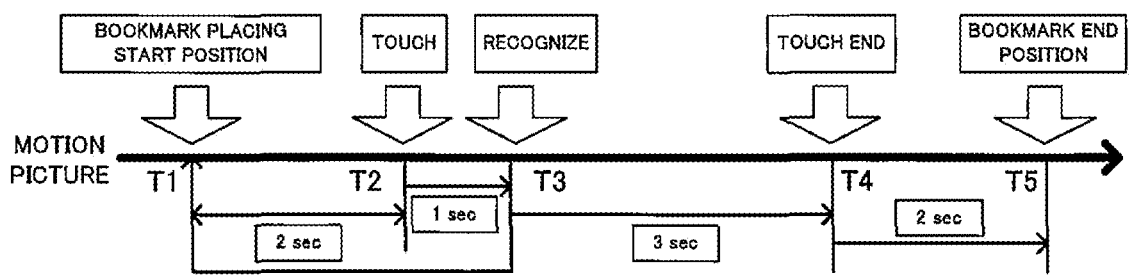
FIG. 11 is a time chart illustrating an example of an operation of designating and preparing the bookmark data, according to the practical example.

In a specific example illustrated in FIG. 11, at a time point T1 on the reproduction time axis of the motion picture content, the operation by the user for designating and generating the bookmark data is not performed yet, and at a time point T2, a touch operation indicating the addition of the bookmark data is performed as the operation by the user. Then, at a time point T3, i.e., one second after the time point T2, it is recognized on the display control apparatus 10 (refer to FIG. 10) that the user is about to add the bookmark data.

Then, after the touch operation is continued in a period in which the user wants to continue to add the bookmark data, for example, for the reason that "this part is important" or for similar reasons, a touch end (i.e., the release of the touch operation or a touch) indicating that the addition of the bookmark data is stopped is performed by the user via the input unit 40 at a time point T4. In this example, the time point T4 is set three seconds after the time point T3; namely, the touch operation for the input unit 40 (refer to FIG. 1) is performed for three seconds. During the addition of the bookmark data, it is possible to input the color data, the name data, and the comment data (refer to FIG. 5), as described above, via a pop-up menu displayed within the screen, or the like.

Then, it is recognized on the display control apparatus 10 (refer to FIG. 1) that the operation by the user indicating the addition of one bookmark data is completed, and the start time point ST associated with the bookmark data (refer to FIG. 4) is set to the time point T1 that is regarded as a "bookmark placing start position", which is two seconds before the time point T2 at which a touch is actually given (in other words, a position three seconds before the time point T3 at which the recognition is made). Before or after this, or at the same time, the end time point ET associated with the bookmark data (refer to FIG. 4) is set to a time point T5 that is regarded as a "bookmark end position", which is two seconds after the time point T4 at which the touch is actually ended. In other words, the touch operation is actually performed only for four seconds (i.e., in a period from the time point T2 to the time point T4), whereas a period in which the bookmark data is added (in other words, a period in which the bookmark mark or the bookmark data is superimposed and displayed on the motion picture content) is eight seconds (i.e., a period from the time point T1 to the time point T5).

Next, with reference to FIG. 12, a specific display screen in adding the bookmark data will be further explained. Firstly, the left side of FIG. 12 illustrates an example of the display screen of the display 30 when the bookmark data is added to the motion picture content that undergoes the motion picture display. The right side of FIG. 12 illustrates an example of the display screen of the display 30 when the bookmark data is displayed as the bookmark mark on the motion picture content, after storage OK is set on the display screen on the left side of FIG. 12.

As illustrated on the left side of FIG. 12, a display screen 30-1 displays, in a top right part, a menu screen 30a including operation buttons of "CHANGE BOOKMARK NAME" (i.e. "CHANGE SIORI NAME"), "DESIGNATE COLOR", "COMMENT", "DELETE", etc. (for performing the step S18 in FIG. 7 described above). Each of them can be designated or selected via the input unit 40 (refer to FIG. 14).

If the button of "CHANGE BOOKMARK NAME" is designated or selected, an input screen for changing the name of the bookmark from its default value by text input or the like (e.g., a screen for selecting or designating the name of the bookmark that enables the user to easily understand, or a screen for text input) is opened or developed as a window display or a pop-up display (refer to the step S18 in FIG. 7).

If the button of "DESIGNATE COLOR" is designated or selected, an input screen for changing the color of the bookmark from its default value (e.g., a screen for selecting the color of a bookmark (i.e., a "siori" in Japanese) from among red, yellow, green, blue and white) is opened or developed as a window display or a pop-up display (refer to the step S18 in FIG. 7).

If the button of "COMMENT" is designated or selected, an input screen for inputting the comment by text input (e.g., a screen on which 50 characters can be inputted) is opened or developed as a window display or a pop-up display (refer to the step S18 in FIG. 7).

If the button of "DELETE" is designated or selected, the bookmark data is deleted.

The display screen 30-1 further displays a screen 30c for confirmation including "CANCEL" (i.e., storage cancel) or "OK" (i.e., storage OK), which is included in a window screen 30b indicating an identification number of the bookmark (which is "SIORI No. 0012" in this example), wherein the touch or click operation can be performed on the screen 30c (refer to the step S18 in FIG. 7).

For convenience of explanation, on the left side of FIG. 12, the menu screen 30a and the window screen 30b are illustrated large enough to protrude from the screen of the motion picture content, but these screens are actually displayed within the display screen 30-1 of the display 30 (refer to FIG. 1) or the motion picture content.

If "OK" (i.e., storage OK) is clicked or touched within the window screen 30b, as illustrated in the right side of FIG. 12, a bookmark mark 30d indicating the presence of the bookmark data is displayed at the top right of a display screen 30-2 on which the motion picture content is reproduced. Then, during the display of the bookmark mark 30d, if it is clicked or touched by the user as an operation input button, the content of the bookmark data whose presence is indicated by the bookmark mark (refer to FIG. 4 and FIG. 5) is accordingly displayed in a predetermined format.

Particularly in the practical example, the bookmark mark 30d is rectangle and displays therein, as text, the total number of people or users ("244" users in this example) who add the bookmark data to the motion picture content that is being reproduced (e.g., at least a part of the motion picture content that exists within 5 seconds before or after the motion picture content to which the bookmark data is added) in the same manner as the user of interest. Data associated with the total number of people is obtained, for example, via the Internet 1000 from the bookmark data server apparatus 1300 configured to extract the bookmark data from many client apparatuses 1200 to perform a statistical process (refer to FIG. 3).

During the display of the display screen 30-1 on the left side of FIG. 12, the motion picture display of the motion picture content may be continued, or may be also temporarily changed to the still picture display. The still picture display may be convenient because an input operation can be performed by using the menu screen 30a with time allowance.

According to the practical example illustrated in FIG. 12, the operation of adding the bookmark data can be performed on a reproduction screen of the motion picture content, and when the addition is completed, the user can know the total number of other people or users who add the bookmark data (in other words, the tendencies of rivals) in the same manner as the user of interest.

Next, with reference to FIG. 13, a specific display screen in searching for the bookmark data will be further explained. Firstly, the left side of FIG. 13 indicates an example of the display screen of the display 30 when the bookmark data is searched for with respect to the motion picture content that undergoes the motion picture display. The right side of FIG. 13 indicates an example of the display screen of the display 30 when the bookmark data is displayed as the bookmark mark on the motion picture content, after a search (or specifically, an operation of selecting the name in the list) has been performed on the display screen on the left side of FIG. 12.

As illustrated on the left side of FIG. 13, a display screen 30-3 displays a list screen 30e including which bookmark data to which name is added (refer to FIG. 5, etc.) is required to be searched for, by a pop-up display, a pulldown menu display, a window display, and the like. For convenience of explanation, on the left side of FIG. 13, the list screen 30a is illustrated large enough to protrude or outside from the screen of the motion picture content, but the list screen 30a is actually displayed within the display screen 30-3 of the display 30 (refer to FIG. 1) or the motion picture content.

When one name (e.g., a name of "this is interesting!") is selected by the user from among a plurality of names listed up in a "SIORI LIST (i.e., bookmark list)" on the list screen 30a displayed as described above, as illustrated on the right side of FIG. 13, the still picture reproduction or the motion picture reproduction of the motion picture content to which a bookmark mark 30f having the name selected here is added is performed, and a display screen 30-4 in which the bookmark mark 30f is superimposed on the motion picture content is displayed.

Moreover, the total number of people or users ("687" users in this example) who add the bookmark data to the motion picture content that is being reproduced (e.g., at least a part of the motion picture content that exists within 5 seconds before or after the motion picture content to which the bookmark data is added) is displayed as text. Data associated with the total number of people is obtained, for example, via the Internet 1000 from the bookmark data server apparatus 1300 configured to extract the bookmark data from many client apparatuses 1200 to perform a statistical process (refer to FIG. 3).

Then, during the display of the bookmark mark 30f, if it is clicked or touched by the user as the operation input button, the content of the bookmark data whose presence is indicated by the bookmark mark (refer to FIG. 4 and FIG. 5) is accordingly displayed in a predetermined format.

Next, with reference to FIG. 14 and FIG. 15, a configuration of the bookmark data will be explained.

FIG. 14 schematically illustrates the bookmark data owned by three users A, B, and C. FIG. 15 schematically illustrates the bookmark data owned by three users D, E, and F.

As illustrated in FIG. 14, the user A has a siori (i.e., bookmark) A file 13a including bookmark data siori A-1 to siori A-7, as a default file or a file that is downloaded or generated by the user's own client apparatus, or the like. The user B has a siori B file 13b including bookmark data siori B-1 to siori B-10, as a default file or a file that is downloaded or generated by the user's own client apparatus, or the like. The user C has a siori C file 13c including bookmark data siori C-1 to siori C-5, as a default file or a file that is downloaded or generated by the user's own client apparatus, or the like. Such a siori file may be held or managed by each client apparatus, but may be uploaded on a cloud apart from each private information, and may be shared or held in common on a plurality of client apparatuses as shared information to be referred to, as occasion demands.

Figure 15:
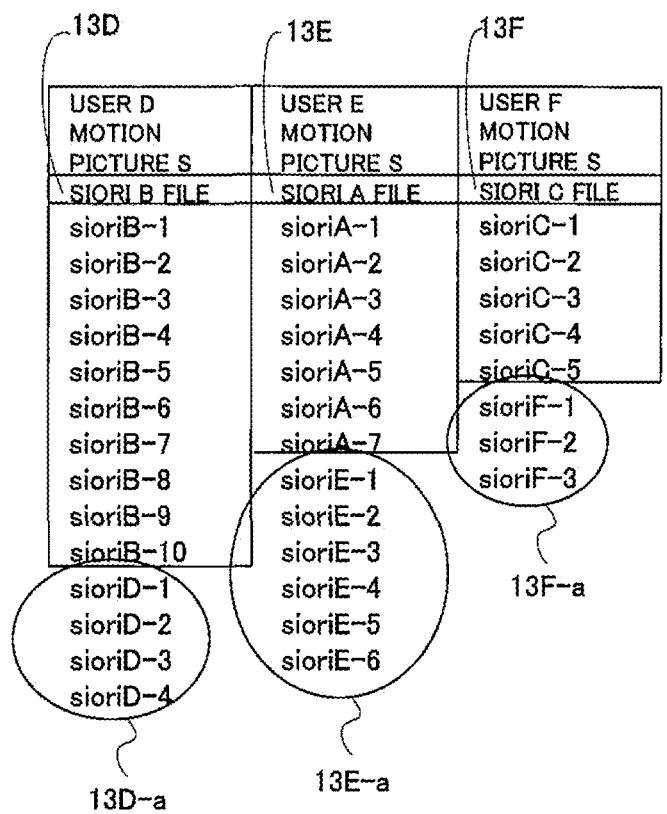
FIG. 15 is version 2 of a conceptual view illustrating a structure of bookmark data prepared by a plurality of users, according to the practical example.

As illustrated in FIG. 15, the user D has the bookmark data siori B-1 to siori B-10 (i.e., the siori B file illustrated in FIG. 14) and a siori file set 13D obtained by downloading bookmark data siori D-1 to siori D-4 (a part surrounded by a circle as a file set 13D-a in FIG. 15) as a default file or a file that is downloaded or generated for the user's own client apparatus, or the like.

The user E has the bookmark data siori A-1 to siori A-7 (i.e., the siori A file illustrated in FIG. 14) and a siori data set 13E obtained by downloading bookmark data siori E-1 to siori E-6 (a part surrounded by a circle as a file set 13E-a in FIG. 15) as a default file or a file that is downloaded or generated for the user's own client apparatus, or the like.

The user F has the bookmark data siori C-1 to siori C-5 (i.e., the siori C file illustrated in FIG. 14) and a siori data file 13F obtained by downloading bookmark data siori F-1 to siori F-6 (a part surrounded by a circle as a file set 13F-a in FIG. 15) as a default file or a file that is downloaded or generated for the user's own client apparatus, or the like.

Particularly in the practical example, as illustrated in FIG. 15, the downloaded siori file can be additionally recorded (i.e., the bookmark file owned by the user before the downloading can remain without being lost).

Next, with reference to FIG. 16 to FIG. 19, "various icons" as one of display forms of the bookmark mark or the bookmark data will be explained. FIG. 16 to FIG. 19 illustrate four types of icons whose look or shape changes in accordance with the total number of people who have added such bookmark data.

Firstly, regarding how to count the total number of people, for example, the number of users who have added the bookmark data to at least a part of the motion picture content that exists within 5 seconds before or after the motion picture content to which the bookmark data has been added is counted as the total number of people. Then, the icon whose look or shape changes in accordance with the total number of people obtained as a result of such counting, is displayed.

Figure 16:
FIG. 16 is a plan view illustrating an example of an icon, according to the practical example.
Figure 17:
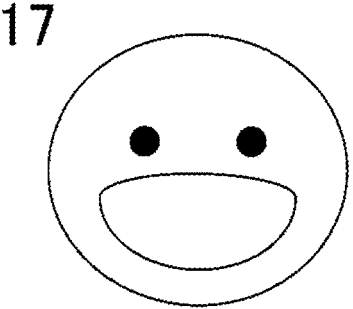
FIG. 17 is a plan view illustrating another example of the icon, according to the practical example.
Figure 18:
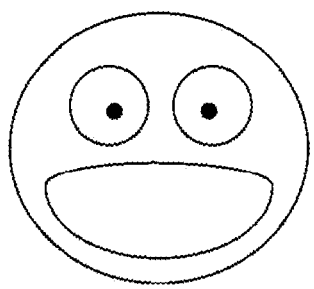
FIG. 18 is a plan view illustrating another example of the icon, according to the practical example.
Figure 19:
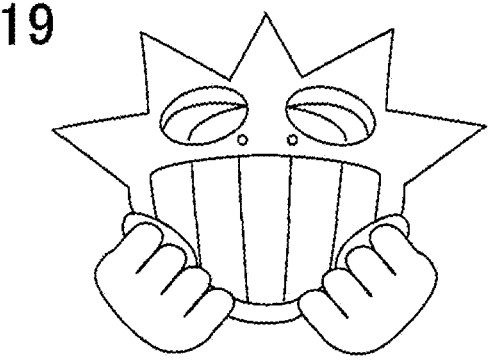
FIG. 19 is a plan view illustrating another example of the icon, according to the practical example.

For example, between N1 and N2 with the lowest total number of people (e.g., 10 to 15% of all the audiences, or less), the icon illustrated in FIG. 16 (or specifically, a "smile mark" icon) is displayed. Between N2 and N3 with a sufficient total number of people (e.g., about 10 to 50% of all the audiences), the icon illustrated in FIG. 17 (or specifically, a "good laugh mark" icon) is displayed. Between N3 and N4 with a high total number of people (e.g., about 50 to 90% of all the audiences), the icon illustrated in FIG. 18 (or specifically, an "exciting mark" icon) is displayed. Between N4 and N5 with the highest total number of people (e.g., 85 to 90% of all the audiences, or more), the icon illustrated in FIG. 19 (or specifically, an "enthusiastic" icon) is displayed.

The data associated with the total number of people as described above is obtained, for example, via the Internet 1000 from the bookmark data server apparatus 1300 configured to extract the bookmark data from many client apparatuses 1200 to perform a statistical process (refer to FIG. 3). The data associated with the total number of people is obtained, for example, as something that indicates the total number, which is obtained by measuring the bookmark data of all the users on a time line of the same motion picture content.

In the practical example, as the icons as illustrated in FIG. 16 to FIG. 19, the shape or the like of the enthusiastic icon that is noticeable or that stands out on the screen, which is known by the user in advance, is set in advance. Then, for example, the "enthusiastic icon" indicating that many bookmark data has been added to the same motion content part is displayed to be noticeable or to stand out on the screen if the total number of the bookmark data is greater than or equal to a predetermined threshold value. For example, from among FIG. 16 to FIG. 19, the enthusiastic icon in FIG. 19 whose meaning is known by the user in advance and that is visually noticeable is adopted. By this, for example, in the case of a position of the motion picture content to which the bookmark data is added due to such a matching judgment that "it is important" or the like among users who are many or a large majority of examinees, the bookmark data indicating such a situation (which is the enthusiastic icon in this case) is displayed, and it can be easily used by each user. In addition, for example, if the number of the bookmark data is measured for the same person (i.e., another user with the same school of choice and an approximate deviation value) as the user, it is more useful as reference information.

Figure 20:
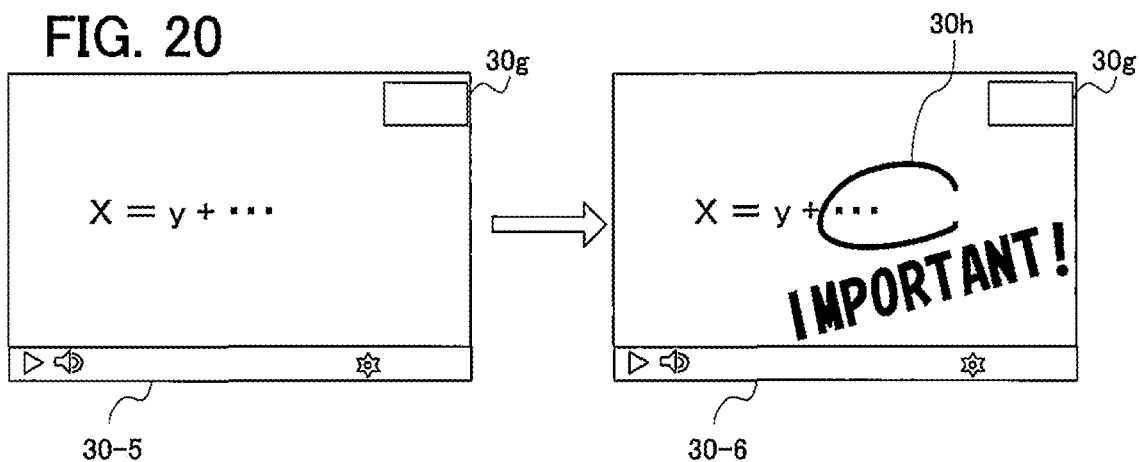
FIG. 20 is a schematic conceptual view illustrating an example of a change in the display screen when graffiti data is written and displayed on motion picture content with the bookmark data added, according to the practical example.
Figure 21:
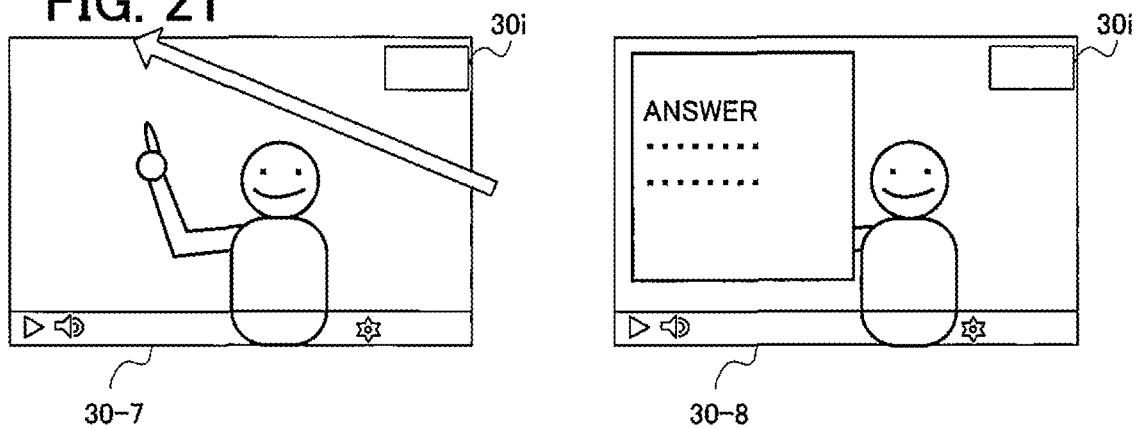
FIG. 21 is a schematic conceptual view illustrating an example of a change in the display screen when another content is obtained from a link destination and is displayed on the motion picture content with the bookmark data added, according to the practical example.

Next, with reference to FIG. 20 and FIG. 21, additional practical examples will be further explained.

In the practical example illustrated in FIG. 20, as illustrated on the left side of FIG. 20, within a display screen 30-5, during the still picture reproduction or the motion picture reproduction of a motion picture content part to which bookmark data 30g is added, a desired character or drawing pattern can be inputted by the user via the input unit 40. Then, the bookmark display control unit 12 is configured to superimpose and display a desired character or drawing pattern 30h, which is inputted via the input unit 40 together with the bookmark data 30g, on the motion picture content, within a display screen 30-6, as illustrated on the right side of FIG. 20.

According to this practical example, while the bookmark data 30g is displayed as the bookmark mark, so-called "graffiti" are allowed. Thus, due to the presence of both the bookmark data 30g and the character or drawing pattern 30h, the user can realize a display with a more information amount or with a higher degree of freedom, visually, with respect to a desired position of the motion picture content.

In addition to or instead of such a graffiti function, the bookmark display control unit 12 may be also configured to display a trace of a contact with the touch panel or a trace of a mouse on the input unit 40, as the bookmark data or the bookmark mark, by a presentation by a highlighter on the display screen. In other words, as illustrated on the right side of FIG. 20, the graffiti character or drawing 30h may be also allowed to function as the bookmark mark that replaces the bookmark data 30g. Then, the bookmark data can be displayed on the motion picture content, in a variable shape corresponding to the trace of the operation by the user, and as something that extremely stands out due to the highlighter. For the thumbnail described above (refer to the step S21 in FIG. 8 and the explanation thereof), i.e., the thumbnail indicating a part to which a particularly important bookmark is added, it is effective if a position written by the highlighter is selected.

In the practical example illustrated in FIG. 21, as illustrated on the left side of FIG. 21, within a display screen 30-7, during the still picture reproduction or the motion picture reproduction of a motion picture content part to which bookmark data 30i is added as the bookmark mark, a process of calling image data of a link destination linked to the bookmark data 30i may be performed in response to an instruction input from the user via the input unit 40, and as illustrated on the right side of FIG. 21, the image data of the link destination called can be displayed within a display screen 30-8 in a predetermined format (specifically, a window display, etc.). At this time, the image data associated with the link destination corresponding to the bookmark data 30i (e.g., still picture data or motion picture data, which presents a question and an answer/explanation related to the part associated with the motion picture content to which the bookmark data is added, and which can be obtained from a server of the link destination or the like) is displayed by performing a plurality of types of operations with a touch panel, a mouse, or the like, which constitutes the input unit 40 (refer to FIG. 1), on the bookmark data having a function as the operation button.

Particularly, even under an environment in which it is strongly desired to perform the destination, change, addition, or similar actions of the link destination, it is possible to easily perform the destination, setting, change, addition, or similar actions of a desired link destination, in response to a desired position of the motion picture content in the end. At this time, the use of the bookmark data makes it possible to construct a mechanism of selecting the link destination on the motion picture content by using a far smaller amount of data, in comparison with a situation in which various data for the link destination is constructed for each frame of the motion picture content.

In addition, in the practical example described above, instead of storing the bookmark data for time information that constitutes a typical example of the "time axis", the content of what a lecturer talks in the motion picture may be divided by a clause or a very short chapter or section, and the bookmark data may be stored in units of the clause or the like. When the content is divided into the clauses or the like, the content is listened to by a person and can be divided by the person's appropriate operation input, or the content may be divided by AI (Artificial Intelligence). An array of the clauses or the like arranged irregularly in time, as described above, also constitutes a type of or a modified example of the "time axis" according to the present invention. In other words, what constitutes the "time axis" according to the present invention may be the time information itself, such as a time stamp, or may be a row, an array, or the like of clause numbers, chapter numbers, track numbers, etc., that change with time in ascending order or the like.

Moreover, for example, "explanations for past examination questions of A university in 2016" may be handled as the bookmark set provided by an examination institution. In providing the motion picture, the omission or leakage of the content of a lecture can be checked by preparing the bookmark set, which leads to an improvement in the content.

As explained in detail above, it is possible to add a desired bookmark to the motion picture content, in other words, to put a bookmark, while adopting a relatively plain or simple apparatus configuration in a relatively plain or simple method, and this allows various reproduction displays using the bookmark, which is extremely useful in practice.

Particularly, even under an environment in which it is strongly desired to perform the destination, change, addition, or similar actions of the bookmark data that the user of the display control apparatus wants to add, it is possible to easily perform the destination, setting, change, addition, or similar actions of desired bookmark data, in response to an arbitrary object in the end. Moreover, a program required to realize the display control apparatus can be simplified, and a processing time, a processing amount, or a data amount can be also significantly reduced.

The present invention is not limited to the embodiments and practical example described above, but various changes may be made, if desired, without departing from the essence or spirit of the invention which can be read from the claims and the entire specification. A display control apparatus and a computer program that involve such changes are also intended to be within the technical scope of the present invention.

DESCRIPTION OF REFERENCE NUMERALS AND LETTERS 10 display control apparatus
11 motion picture display control unit
12 bookmark display control unit
13 bookmark database
14 bookmark designation generation unit
15 search unit
20 motion picture content database
30 display
40 input unit

The invention claimed is:

1. A display control apparatus comprising:
a first controlling device configured to perform still picture reproduction or motion picture reproduction of motion picture content, within a screen of a displaying device;
a second controlling device configured to superimpose and display bookmark data, which indicates a bookmark having a predetermined shape and which is independent of the motion picture content, on the motion picture content only in a predetermined period on a time axis of the motion picture content, in a predetermined position or range within the screen, during the still picture reproduction or the motion picture reproduction of the motion picture content; and
a holding device configured to hold the bookmark data in association with the time axis of the motion picture content,
further comprising a bookmark designation generating device configured to designate or generate the bookmark data, in accordance with an input of an instruction indicating addition of the bookmark data, during the still picture reproduction or the motion picture reproduction of the motion picture content, wherein
said first controlling device is configured to change from the motion picture reproduction of the motion picture content to the still picture reproduction, when an operation associated with a trigger for starting generation of the bookmark data is performed for a time period that is shorter than a predetermined time period.

2. The display control apparatus according to claim 1, wherein
said bookmark designation generating device is configured to designate or generate the bookmark data accompanied by at least one of a color, a name, and a comment associated with the bookmark, in accordance with an input of an instruction indicating designation of the at least one, in addition to the instruction indicating the addition, and
said second controlling device is configured to display the bookmark data in accordance with the at least one that accompanies the bookmark data.

3. The display control apparatus according to claim 2, wherein said bookmark designation generating device is configured to designate or generate the at least one within a window screen or on a pulldown menu, which is superimposed and displayed on at least one of the motion picture content and the bookmark data.

4. The display control apparatus according to claim 1, wherein
the screen is a screen of a touch panel, and
said bookmark designation generating device is configured to use a contact with the touch panel made by an operator as a trigger for starting generation of the bookmark data, and is configured to use an end of the contact as a trigger for ending the generation of the bookmark data.

5. The display control apparatus according to claim 4, wherein said bookmark designation generating device is configured to use an operation of the contact as the trigger, only when the operation of the contact is performed for a time period that is longer than a predetermined time period.

6. The display control apparatus according to claim 4, wherein said second controlling device is configured to display a trace of the contact from the trigger for starting the generation to the trigger for ending the generation, as the bookmark data, by a presentation by a highlighter on the screen.

7. The display control apparatus according to claim 1, wherein said bookmark designation generating device is configured to use a first operation performed by an operator on a mouse, as a trigger for starting generation of the bookmark data, and is configured to use a second operation on the mouse as a trigger for ending the generation of the bookmark data.

8. The display control apparatus according to claim 7, wherein said bookmark designation generating device is configured to use an operation of the mouse as the trigger, only when the operation of the mouse is performed for a time period that is longer than a predetermined time period.

9. The display control apparatus according to claim 7, wherein said second controlling device is configured to display a trace of the operation of the mouse performed from the trigger for starting the generation to the trigger for ending the generation, as the bookmark data, by a presentation by a highlighter on the screen.

10. The display control apparatus according to claim 1, wherein said first controlling device is configured to change from the motion picture reproduction of the motion picture content to the still picture reproduction or slow reproduction, in case that the bookmark data is designated or generated by said bookmark designation generating device.

11. The display control apparatus according to claim 1, wherein
said holding device is configured to hold link destination identification information, which corresponds to the bookmark data and which identifies a desired link destination, as a part of the bookmark data or in association with the bookmark data, and
said second controlling device is configured to display image data associated with a link destination, which is identified by the link destination identification information, as a part of the bookmark data or in association with the bookmark data, in addition to or instead of the motion picture content, during the motion picture reproduction or the still picture reproduction of the motion picture content.

12. The display control apparatus according to claim 1, wherein
said display control apparatus is accommodated in one network with another or other display control apparatuses, and
said second controlling device is configured to display at least one of (i) one bookmark data generated by another display control apparatus and (ii) processed bookmark data indicating a result of a statistic process based on a plurality of bookmark data generated by other display control apparatuses, which are obtained via the network, in addition to or instead of the bookmark data associated with said display control apparatus.

13. The display control apparatus according to claim 12, wherein said second controlling device is configured to display the bookmark data as a bookmark, wherein the bookmark expresses, in a predetermined form, a total number of the bookmark data that are associated with the same motion picture content and that have the same predetermined period or have the predetermined period that overlaps at least partially, on the basis of the processed bookmark data.

14. The display control apparatus according to claim 12, wherein said second controlling device is configured to display image data indicating an icon whose shape varies in accordance with the total number, as the processed data that replaces the bookmark data or in addition to the processed data, when the total number of the bookmark data that are associated with the same motion picture content and that have the same predetermined period or have the predetermined period that overlaps at least partially, exceeds a predetermined threshold value.

15. The display control apparatus according to claim 1, wherein
said display control apparatus further comprises an inputting device configured to input a desired character or drawing pattern during the still picture reproduction or the motion picture reproduction of the motion picture content,
said second controlling device is configured to superimpose and display the desired character or drawing pattern inputted by said inputting device, on the motion picture content, together with the bookmark data or as at least a part of the bookmark data, and
said holding device is configured to hold image data indicating the character or drawing pattern, in association with the bookmark data.

16. A non-transitory computer-readable medium on which is stored a program that, when executed by a computer, causes the computer to function as the display control apparatus according to claim 1.

* * * * *